United States Patent [19]

Sasaki et al.

[11] Patent Number: 5,189,266
[45] Date of Patent: Feb. 23, 1993

[54] VEHICULAR EXHAUST RESONANCE SUPPRESSION SYSTEM AND SENSING MEANS THEREFORE

[75] Inventors: Akira Sasaki; Yoshikazu Hayakawa; Yuichi Sakuma; Tatsuo Sakai, all of Yokosuka; Yoshinori Kihara, Yokohama, all of Japan

[73] Assignee: Nissan Motor Co., Ltd., Yokohama, Japan

[21] Appl. No.: 531,225

[22] Filed: May 31, 1990

[30] Foreign Application Priority Data

Jun. 9, 1989 [JP] Japan ................ 1-147528
Jun. 9, 1989 [JP] Japan ................ 1-147529
Jun. 9, 1989 [JP] Japan ................ 1-147530
Jun. 9, 1989 [JP] Japan ................ 1-147531
Jun. 9, 1989 [JP] Japan ................ 1-147532

[51] Int. Cl.$^5$ .......................... F01N 7/08; F01N 1/00
[52] U.S. Cl. .......................... 181/227; 181/254
[58] Field of Search ............ 181/227, 214, 215, 226, 181/254

[56] References Cited

U.S. PATENT DOCUMENTS 4,079,808  3/1978  Mizuno et al. ............ 181/254 X
4,867,768  9/1989  Wagner et al. ............ 181/231 X
4,901,528  2/1990  Saigo et al. ............... 181/254 X

FOREIGN PATENT DOCUMENTS 48-39453  11/1973  Japan .
62-57718  4/1987  Japan .
62-57719  4/1987  Japan .
62-126214  6/1987  Japan .
63-82022  1/1988  Japan .

Primary Examiner—Michael L. Gellner
Assistant Examiner—Jae N. Noh
Attorney, Agent, or Firm—Lowe, Price, LeBlanc & Becker

[57] ABSTRACT

A resonance detection device is provided for detecting resonance in an exhaust passage of an automotive vehicle. The detection device employs a temperature sensor in combination with an arrangement which enables the sensor to be exposed to a flow of exhaust gas the temperature of which is different from the temperature of the bulk of the flow, when resonance occurs. In given embodiments the arrangement takes the form different diameter conduits and/or vessels, while others it takes the form of a heat exchange device which either heats or cools the gases, and which is disposed proximate the temperature sensor. When no resonance occurs in the passage, the output of the temperature sensor remains stable. When resonance occurs the fluid flow characteristics in the passage change in a manner wherein the gas which has been either heated or cooled by the heat exchange device is induced to flow against the temperature sensor. The sensed temperature change can be used to control a valve via which the resonance characteristics of the passage are modified and via which resonance is attenuated.

14 Claims, 16 Drawing Sheets

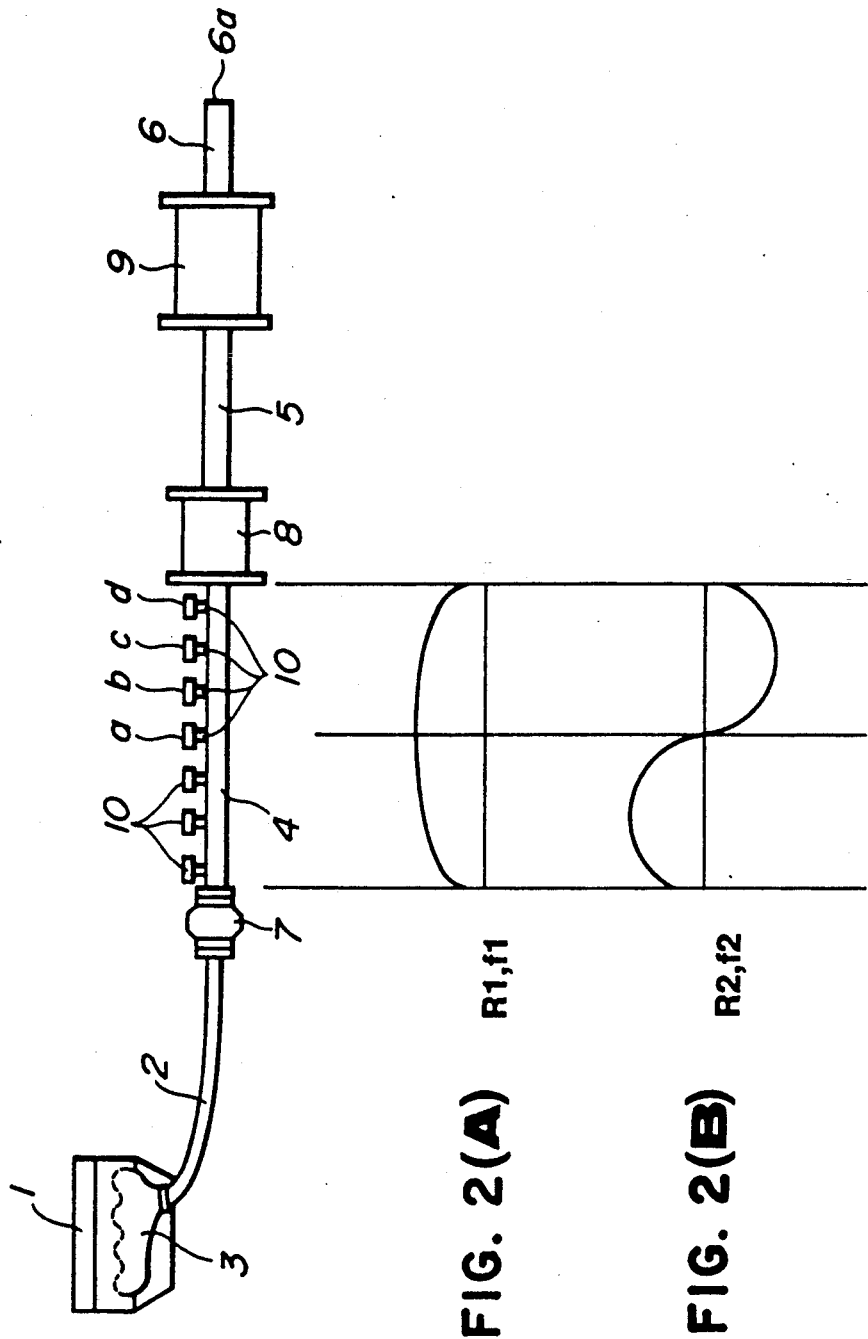

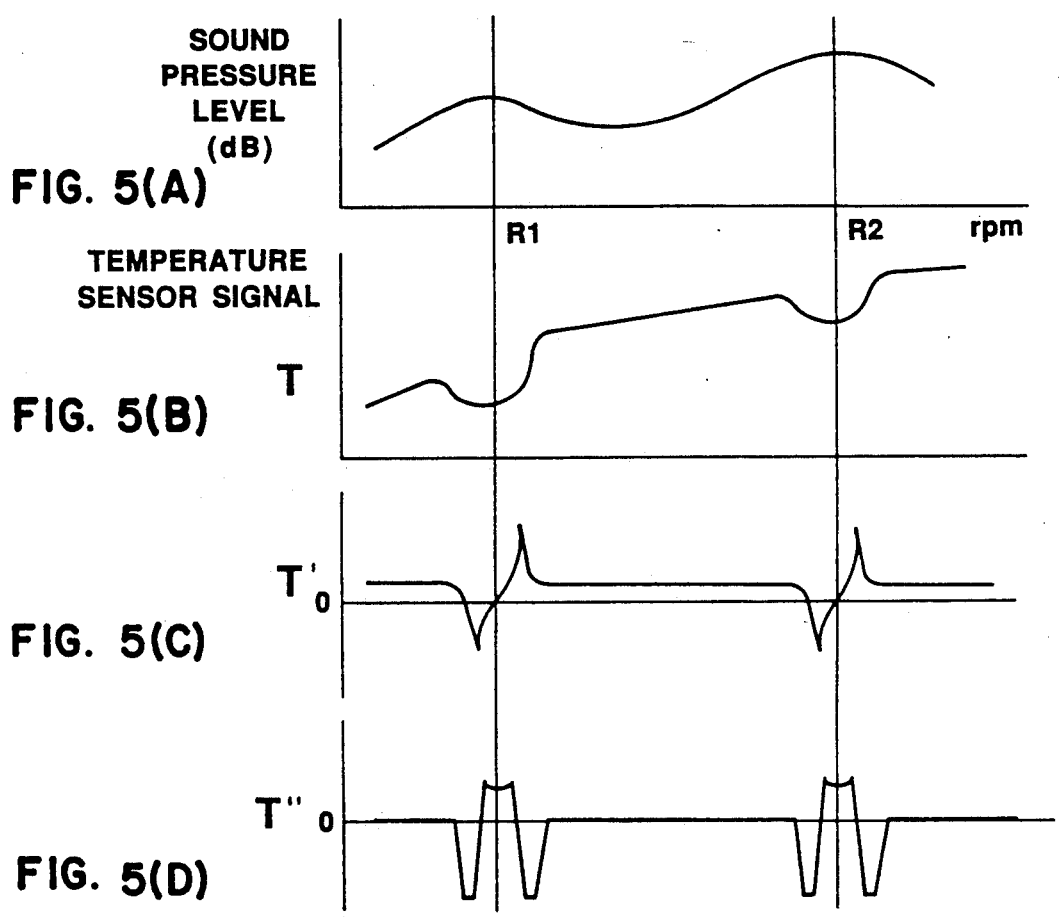

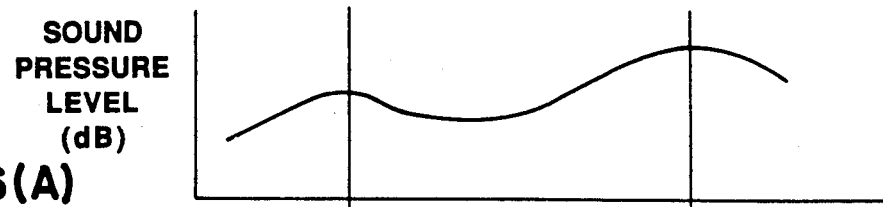
FIG. 6(A) SOUND PRESSURE LEVEL (dB)
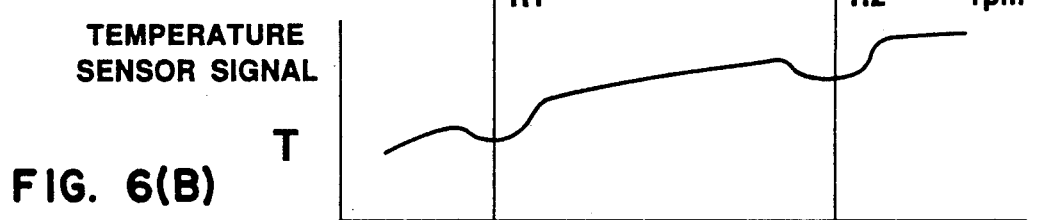
FIG. 6(B) TEMPERATURE SENSOR SIGNAL T
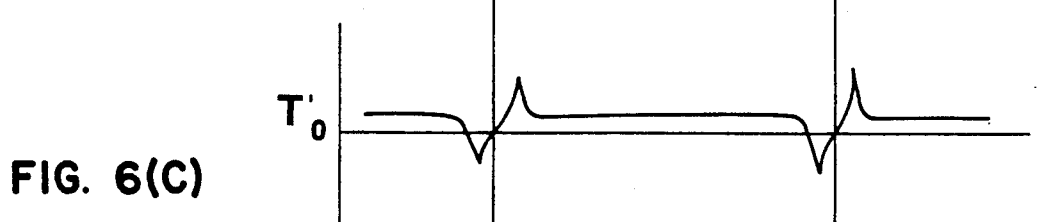
FIG. 6(C) T'₀
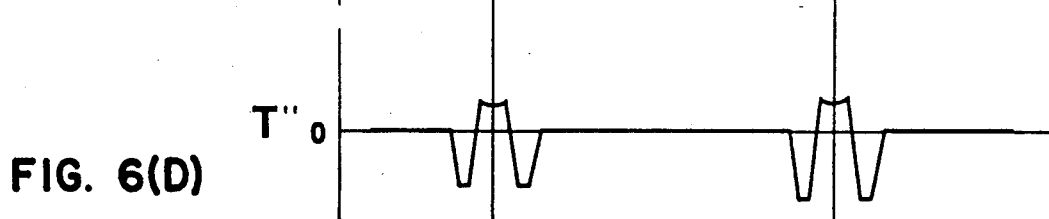
FIG. 6(D) T"₀

SOUND PRESSURE LEVEL (dB)

TEMPERATURE SENSOR SIGNAL T

T'

T*

TRIGGER SIGNAL

TRIGGER SIGNAL

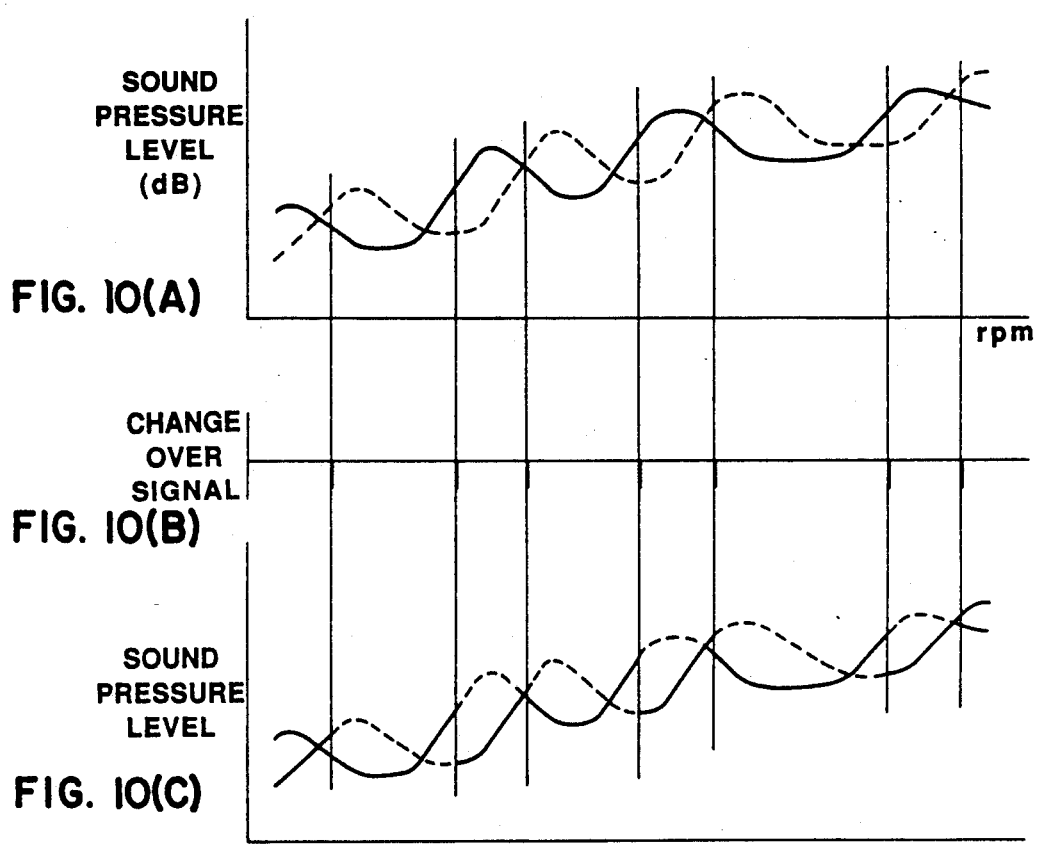

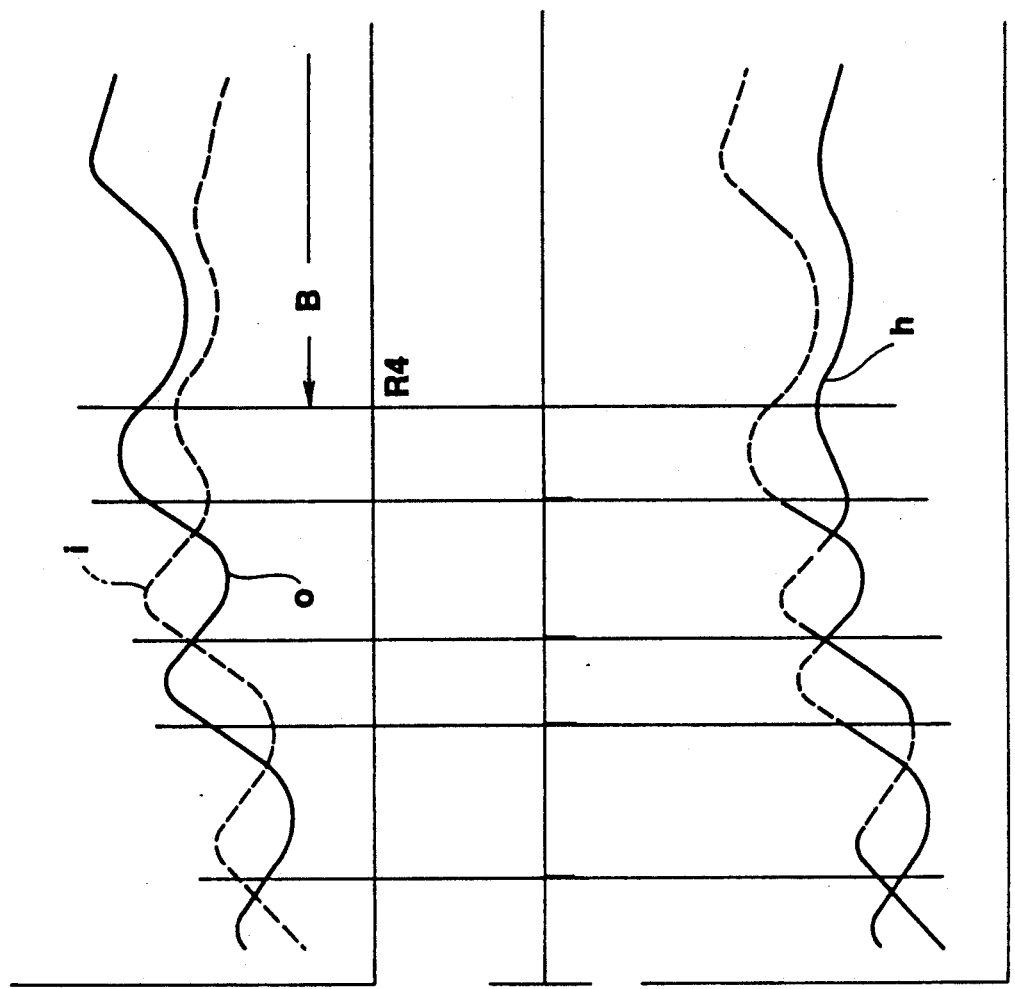

VEHICULAR EXHAUST RESONANCE SUPPRESSION SYSTEM AND SENSING MEANS THEREFORE

BACKGROUND OF THE INVENTION

1. Field of the Invention

The present invention relates to a device for detecting and suppressing resonance in a passage conducting a high temperature gas, such as an exhaust passage of an automotive vehicle. More specifically, the present invention relates to an arrangement wherein exhaust system can be selectively tuned in a manner which suppresses resonance.

2. Description of the Prior Art

In internal combustion engines, having exhaust systems according to the prior art, it has been found that during the period before the engine is completely warmed up, there is a tendency for the engine to produce a loud, high pitched, metallic sound, when accelerated at certain engine speeds. This sound generally occurs in the 1 to 10 kHz range. Although the exact mechanism by which this sound is produced is still uncertain, its existence and the resulting resonance it causes in the exhaust system have been confirmed and measured.

The problem of the sympathetic resonance occurring in the exhaust system as a result of this sound, is particularly pronounced in high power engines having low back pressure exhaust systems.

It has also been found that the production of this high pitched sound is not limited to just the periods when the engine is being accelerated before it is completely warm, but also occurs under other transitional engine operating states. For example this sound also tends to be produced when the engine is being decelerated under certain conditions. One such condition is during engine braking.

In such engines it is of course possible to reduce the noise from the exhaust by increasing the amount of baffling in the mufflers. In such cases however, as the baffling is increased, the noise is reduced but the power output and fuel efficiency of the engine are reduced as well. For these reasons there is a clear demand felt for an exhaust system wherein the resonances of the engine and exhaust system can be suppressed with a minimum of energy consuming restrictions to the flow of exhaust gasses through the exhaust system.

In order to suppress the noise produced by the engine under these types of conditions, while incurring a minimum of restriction to the flow of exhaust gas, a system disclosed in JP-A-63-82022 was proposed. In this system, the points along the length of the exhaust system that defined the nodes of sound waves at resonant frequencies were determined, and the passage was provided with flow restrictions at the these points. These flow restrictions were intended to reduce the resonance of the exhaust passage at particular frequencies.

In the above system, the flow restrictions were comprised of butterfly valves. Operating these valves enable the selective restriction of the exhaust gas flow at the resonance nodes in a manner which altered the resonance characteristics of the exhaust passage.

Other examples of prior art methods for tuning the resonant frequencies of an exhaust system in order to suppress resonance, are given in JP-A-48-39453 and JP-A-62-57718. In these two documents systems are disclosed in which the exhaust system comprises a plurality of passages of mutually different lengths, and a selector arrangement for selecting which of the passages is open at a given time. By the selection of the exhaust passages, it was attempted to select the effective length of the exhaust system so as to alter the resonating frequency and thus suppress resonance in the exhaust system.

In the respective prior art systems, the engine speed and the engine load were monitored and the exhaust tuning arrangements were controlled on the basis of control values derived as a function of these parameters. For example, at a low engine speed and low engine load, a particular setting would be established arithmetically on the basis of the detected parameters, and what was hoped to be a non-resonant frequency, would be selected for the exhaust system. Conversely, at higher loads and engine speeds the exhaust system was tuned to another frequency.

A problem has been encountered in the types of resonance suppression systems outlined above. The resonating characteristics of the exhaust system have been found to vary with temperature. Because of this, it is impossible, on the basis of the sensed engine speed and engine load alone, to accurately determine the proper timings for operation of the flow restriction valves under all engine operating conditions. Further, in the above systems there was no way of detecting whether or not the frequency of noise which was intended to be suppressed, was actually the one occurring. Therefore, erroneous and/or ineffective operation of the valves tended to result. In some instances this not only failed to suppress the resonance, but actually tended to enhance it, and accordingly increased the level of the noise produced by the engine.

In order to overcome the above problem, it is conceivable to provide a sound pressure sensor in the exhaust passage, by which it would be possible to detect whether or not the resonance is occurring. Providing such a sensor however, induces the problems that the sensor must be highly accurate, and must be able to withstand high temperatures and pressures. For the purposes of experimentation, such a sensor is not difficult to obtain, however with regard to production designs wherein such a sensor is incorporated in an exhaust system, the cost for a sensor having adequate durability has been determined to be too high to be practical.

SUMMARY OF THE INVENTION

It is an object of the instant invention to provide a resonance detection device wherein pressure fluctuations in a passage through which high temperature gas flows, can be detected accurately by means of a sensor which is durable and inexpensive.

It is another object of the invention to provide a resonance suppression device whereby resonance occurring in an exhaust system can be suppressed accurately at all engine speeds, regardless of the fluctuations in frequency and temperature.

In brief, the above objects are achieved by an arrangement wherein a detection device employs a temperature sensor in combination with an arrangement which enables the sensor to be exposed to a flow of exhaust gas the temperature of which is different from the temperature of the bulk of the flow, when resonance occurs.

In given embodiments the arrangement takes the form different diameter conduits and/or vessels, while in others it takes the form of a heat exchange device which either heats or cools the gases, and which is disposed proximate the temperature sensor. When no resonance occurs in the passage, the output of the temperature sensor remains stable. When resonance occurs the fluid flow characteristics in the passage change in a manner wherein the gas which has been either heated or cooled by the heat exchange device is induced to flow against the temperature sensor. The sensed temperature change can be used to control a valve via which the resonance characteristics of the passage are modified and via which resonance is attenuated.

In more specific terms, according to a first aspect the present invention comprises a resonance detection device which features: a passage through which gas flows; a chamber; a chamber connector passage, the chamber connector passage connecting the chamber to the passage; and a temperature sensor which senses the temperature of the gas in the connecting passage.

A second aspect of the present invention comprise a resonance detection device which features: a passage for conducting a flow of gas; temperature detecting means for detecting the temperature of the gas in the passage at a portion of the passage whereat the gas within the passage flows in both axial directions of the passage as a result of resonance occurring within the passage; and heat exchange means disposed within the passage in the near vicinity of the temperature detecting means for altering the temperature of gas proximate the temperature sensing means in response to resonance occurring in the passage.

A third aspect of the present invention comprises a resonance suppression device for an internal combustion engine comprising: an exhaust system, the exhaust system including a passage coupled to an exhaust outlet of an internal combustion engine for directing a flow of exhaust gasses expelled by the internal combustion engine; tuning means for selectively altering a frequency at which gas in the exhaust system resonates; a resonance detecting means, the resonance detecting means including a resonating chamber which is connected by a connector passage to the passage at a portion whereat an anti-node of a sound wave of the resonant frequency occurs, and a temperature sensor, the temperature sensor being disposed in the connector passage; and control means, the control means being responsive to a signal output of the resonance detecting means for switching the tuning means in a manner which alters a resonance frequency of the exhaust system upon the detection of resonance by the resonance detecting means.

A fourth aspect of the present invention comprises a resonance suppression device for an exhaust system of an automotive vehicle which features: a plurality of exhaust pipe sections, the plurality of exhaust pipe sections conducting a flow of exhaust gasses from an exhaust manifold of an internal combustion engine; a chamber; the chamber being disposed between two exhaust pipe sections of the plurality of exhaust pipe sections, the chamber having a cross-sectional area different than a cross-sectional area of the exhaust pipe sections; a variable flow restricting means disposed in the vicinity of an end of an exhaust pipe section of the plurality of exhaust pipe sections which connects to an upstream side of the chamber with respect to the flow of exhaust gasses within the exhaust system, for selectively restricting the flow of exhaust gasses in response to a signal derived from a temperature sensing means; and temperature sensing means, the temperature sensing means being disposed in the vicinity of the variable flow restricting means.

A fifth aspect of the present invention comprises an exhaust system for an internal combustion system which features: an exhaust passage for conducting exhaust gasses of the internal combustion engine; exhaust passage tuning means, the exhaust passage tuning means being operable for altering the resonating frequency of the exhaust passage; temperature sensing means the temperature sensing means being disposed within the exhaust passage for detecting the temperature of gasses within the exhaust passage at a point defined in the vicinity of a resonance node of a sound wave occurring in the passage and outputting a temperature signal indicative thereof; and control means, the control means being responsive to fluctuations in the temperature indicative signal for deriving a control signal for controlling resonance frequency selected by the exhaust passage tuning means.

A further aspect of the present invention comprises a resonance detecting device which features: a passage, the passage having an opening; and temperature sensing means, the temperature sensing means being disposed within the passage in the vicinity of the opening for detecting the temperature of a fluid in the passage.

Another aspect of the present invention comprises a resonance detecting device which features: a passage through which gases flow, the passage having a first portion having a first cross-sectional area, which opens into a second portion having a different cross-sectional area; and temperature sensing means, the temperature sensing means being disposed in a location of the first portion which is proximate the second portion.

Yet another aspect of the present invention comprises a resonance detecting device which features: a passage through which heated gases flow; a temperature sensor; and means which defines part of the passage for exposing the temperature sensor to a flow of gas the temperature of which is different from the bulk of the gas which flows through aid passage, when resonance occurs in the passage.

BRIEF DESCRIPTION OF THE DRAWINGS

FIG. 2 is a schematic depiction of an exhaust system according to a first embodiment of the invention, wherein sound waves, at resonant frequencies of a portion of the exhaust system, are shown graphically beneath it;

FIG. 5 is a timing chart depicting the same set of parameters as the chart of FIG. 4, for a resonance sensor according to the invention located proximate a location whereat an anti-node of a higher resonance frequency pressure wave tends to occur within the same exhaust passage;

FIG. 6 is a timing chart depicting the same set of parameters as shown in FIG. 4, for a resonance sensor according to the invention, located proximate the location where an anti-node of a still higher resonance frequency pressure wave tends to occur within the same exhaust passage;

In FIG. 10 a timing chart shows the relationships between sound pressure levels within the exhaust system at various engine speeds, the resonant frequency of the exhaust system, and the noise levels produced when the resonance suppression system according to the invention is employed;

FIG. 11 is a timing chart which shows the relationships between same parameters as the graphs of FIG. 10, but for a different engine and exhaust system combination;

DETAILED DESCRIPTION OF THE PREFERRED EMBODIMENTS

Figure 1:
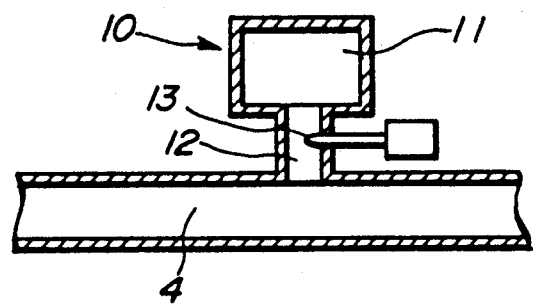
FIG. 1 is a cross-sectional side elevation view of a first embodiment of a resonance sensor according to the invention.

FIG. 1 shows a resonance detection device according to a first embodiment of the invention. A resonance detecting sensor 10 comprising a resonance chamber 11, resonance chamber connector passage 12, and a temperature sensor 13, is provided on a first central passage section 4 of an exhaust pipe.

The outer periphery of the resonance chamber 11 is exposed to the atmosphere. With this arrangement, the gas in the interior of the resonance chamber 11 tends to remain cooler than the exhaust gas within the first central passage section 4. Since the resonance chamber 11 opens only onto a single passage, unless there is a pressure differential between the interior of the resonance chamber 11 and the first central passage section 4, there is no tendency for gasses to flow back and forth between the resonance chamber 11 and the first central passage section 4.

If there is fluctuation in the pressure in the resonance chamber 11 relative to the first central passage section 4, the gas in the first central passage section 4 is induced to flow back and forth, through the resonance chamber connector passage 12 between the first central passage section 4 and the resonance chamber 11. Under these conditions, since the gas in the resonance chamber 11 is cooler than that within the first central passage section 4, the temperature of the gas in the connector passage 12 lowers.

With this arrangement, as long as it is not located at a point within the first central passage section 4, at which a resonance node occurs in a pressure wave, the resonance detecting sensor 10 is effective for detecting the fluctuations in pressure within the first central passage section 4 produced by resonance. Specifically, the resonance detecting sensor 10 is most effective in detecting resonance within the first central passage section 4, when it is connected at a location whereat an anti-node of the particular resonance frequency which it is to detect, tends to occur.

A drop in the temperature reading of the temperature sensor 13 serves to indicate that resonance is occurring within the first central passage section 4.

By providing a plurality of resonance detecting sensors 10 along the length of the passage it is possible to ascertain the occurrence of resonance therein. Further, by detecting which of the sensors detects a drop in temperature, it is possible to determine the positions of the pressure wave antinodes and therefore the frequency at which the resonance is occurring within the passage.

In FIG. 2 an embodiment of an exhaust system for an internal combustion engine 1 is shown schematically.

The internal combustion engine 1 has as exhaust manifold 3 connected thereto. The exhaust manifold 3 is connected to a catalytic converter 7 by means of a front exhaust passage 2. The catalytic converter 7 is connected to the upstream side of a first central passage section 4. A pre-muffler 8, a second central passage section 5, main muffler 9 and a tail pipe 6 are connected in sequence the down stream side of the first central passage section 4.

In this embodiment the first central passage section 4 is provided with a plurality of resonance detecting sensors 10 which are disposed at regular intervals along the length thereof. In this case the number resonance detecting sensors 10 is seven. However, it will be understood that this number has been chosen purely arbitrarily for the purpose of illustrating the invention and that any number of sensors is conceivable. Further, it will be understood that the location of the resonance detecting sensors 10 is not restricted to the first central passage section 4.

Exhaust gasses from the internal combustion engine 1 are collected in the exhaust manifold 3 and are passed through the above mentioned conduiting so as to be ejected at the end of the exhaust chain, through the tail pipe opening 6a.

The line R1, in the graph (A) of FIG. 2, graphically depicts the position of the nodes and the anti-node of a pressure wave having a resonance frequency f1 within the first central passage section 4. The line R2, in the graph (B) of FIG. 2 graphically, depicts the positions of the nodes and the anti-node within the first central passage section 4 at the resonance frequency f2, which is double that f1.

In this embodiment the resonance detecting sensors 10 serve to detect resonance within the first central passage section 4 and the frequency at which it is occurring.

The resonance chamber 11, and the resonance chamber connector passage 12, of the resonance detecting sensor 10, are generally cylindrical and are connected to the outer periphery of the first central passage section 4, so as to extend therefrom at a substantially right angle.

The temperature sensor 13 is arranged at approximately the center of the passage 12. The temperature sensor 13 is comprised of a thermocoupling device.

The peak resonance frequency of the resonance chamber 11, in combination with the resonance chamber connector passage 12, is selected to be higher than the resonance frequency of the first central passage section 4, which is to be measured.

Figure 3:
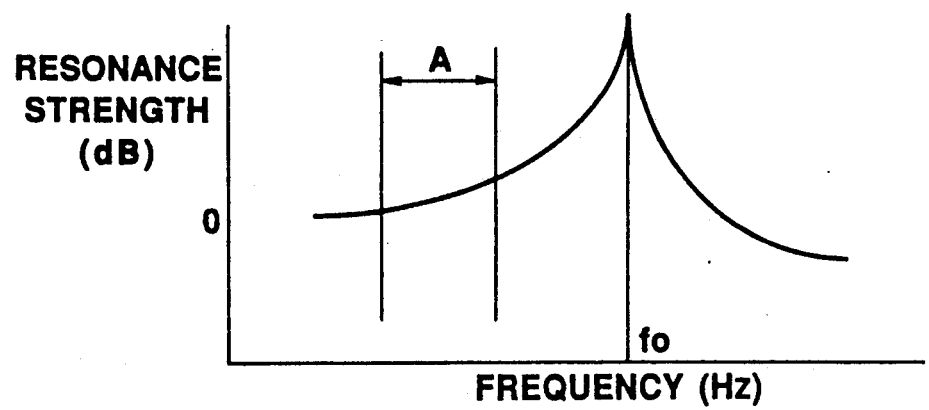
FIG. 3 is a graph showing, in terms of resonance strength and frequency, the resonance characteristics of the sensor arrangement shown in FIG. 1.
Figure 4A:
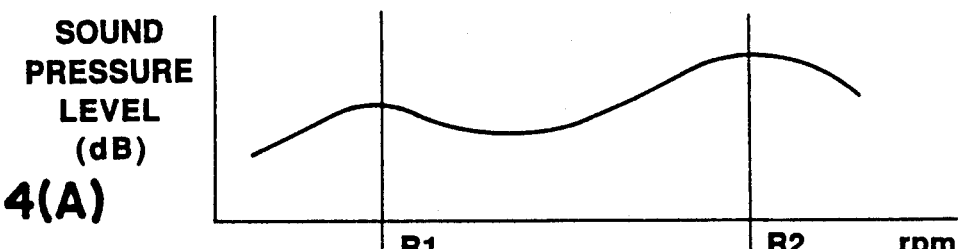
FIG. 4 is a timing chart showing the relationships between the engine speed, the sound pressure levels within the exhaust passage, the temperature signal of the sensor, and first and second time derivatives which are derived from the temperature signal, for a resonance sensor according to the invention which is exposed to an anti-node of a pressure wave having a first resonance frequency.
Figure 4B:
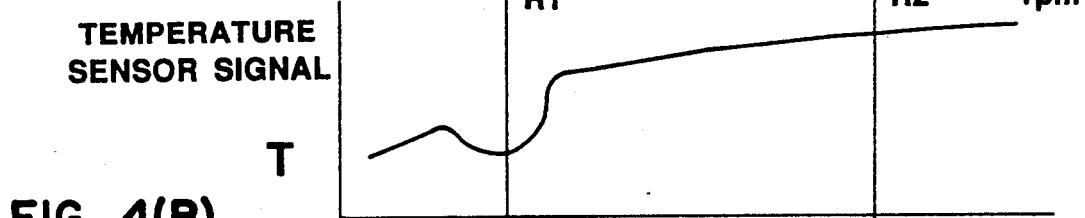
Figure 4C:
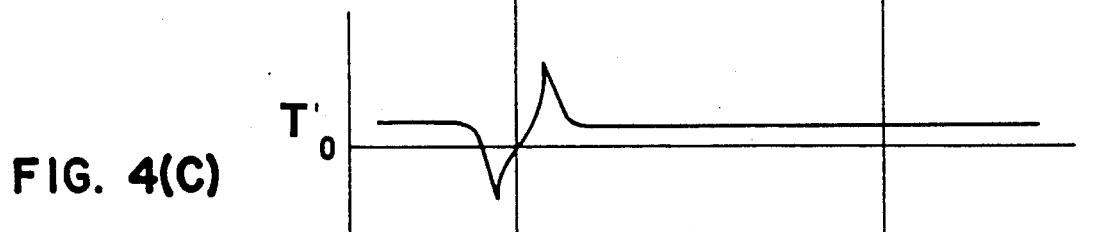
Figure 4D:
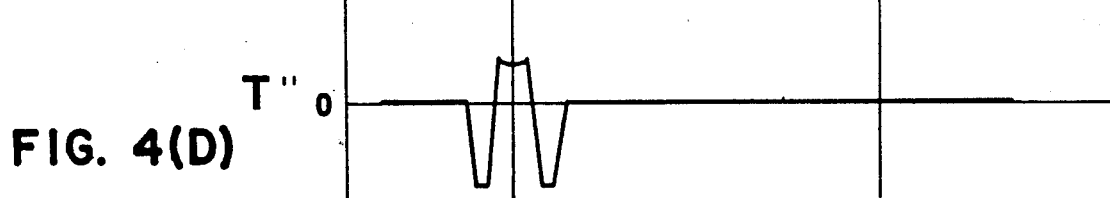

The trace shown in FIG. 3, represents the combined resonating characteristic of the resonance chamber 11 and the resonance chamber connector passage 12. In order to enable stable measurement of the resonance within the passage, it has been found to be preferable that the peak resonance frequency fo of the elements 11 and 12, be separated by a substantial margin from the range A in which measurements are actually conducted. The measurement range A in this instance being that frequency band within which the resonant frequency to be detected by the resonance detecting sensor 10, occurs within the first central passage section 4.

The measurement range A, and the appropriate peak resonance frequency fo for the resonance detecting sensor 10, vary according to the characteristics of the passage to be measured.

In one example, the appropriate peak resonance frequency fo for the resonance detecting sensor 10 is determined to be 1 kHz. In such a case the diameter of the resonance chamber 11 is set at 25 mm, the length is set at 10 mm, the diameter of the connector passage 12 is set at 5 mm and the length thereof is set at 25 mm. In such a case, it will be noted that the overall dimensions of the resonance detecting sensor 10 can be kept extremely small, and the resonance detecting sensor 10 will not add significantly to the overall size of the exhaust system.

FIGS. 4 through 7 graphically show various measured parameters determined in experiments wherein the above device was employed in measuring the resonance in the exhaust system of an automotive engine.

Traces (A) of each of FIGS. 4 through 7, show the relationship between the sound pressure level (dB), within the first central passage section 4, and the engine speed. As will be appreciated from these traces there are two peaks in the sound pressure levels occurring within the first central passage section 4. One of the peaks occurs at a relatively low engine speed, and the next peak occurs at a higher one. These peaks occur as a result of the frequency at which the engine produces pressure waves a the given engine speeds and the resonance frequencies of the first central passage section 4.

The resonance frequency f1 occurs at an engine speed R1. Under these conditions, the nodes of the sound wave correspond to the ends of the first central passage section 4, and the anti-node of the wave corresponds to the center thereof. This relationship may be understood most clearly from a consideration of the graph (A) of FIG. 2, which graphically illustrates pressure levels at points along the length of the first central passage section 4.

On the other hand, resonance frequency f2 occurs at an engine speed of R2. Under these conditions the nodes of the sound pressure wave occur at substantially the center and ends of the first central passage section 4, and the anti-nodes of the wave, occur at points that are at one third and two thirds the length thereof. This relationship may be understood most clearly from a consideration of the graph (B) of FIG. 2, which graphically illustrates pressure levels at points along the length of the first central passage section 4.

In the trace B of FIG. 4 the temperature indicative output T of the sensor A of FIG. 2 is plotted. As will be seen from this trace, aside from the dip which occurs at the engine speed R1, the temperature indicative output T, of the sensor denoted by "a" in FIG. 3, increases at a steady rate which is proportional to the engine speed.

As has been mentioned above, in connection with FIG. 2, at the engine speed R1 the anti-node of the pressure wave is positioned very close to "a" on the first central passage section 4. Therefore, the drop in the temperature signal of the point a resonance detecting sensor 10, can be attributed to the phenomenon mentioned above wherein the cooler gas within the resonance chamber 11 is brought into contact with the temperature sensor 13 as a result of the fluctuating pressure in the first central passage section 4.

In trace (C) of FIG. 4, the signal output T has been differentiated to produce a first derivative T'. In the graph (D) of FIG. 4 the derivative T' has been subjected to a second differentiation to derive a second derivative T''.

In the event that the second derivative T" deviates from 0, the resonance is indicated as occurring in the first central passage section 4.

When the internal combustion engine 1 is running at the engine speed R2, resonance at the second resonance frequency f2 occurs. Under these conditions, as can be seen from FIG. 2, the central node of the wave occurs at the "a". Therefore, there is essentially no pressure fluctuation within the first central passage section 4 at this point, so there is essentially no fluctuation in the temperature indication output T of the point a resonance detecting sensor 10. In this case the second derivative does not deviate from 0.

In FIG. 5 the resonance frequencies and their relationship to the engine speed, and the fluctuations of the output of the resonance detecting sensor 10 mounted on the first central passage section 4 at the point "b" are shown graphically. As in FIG. 4 the first and second derivative values T' and T" derived from the temperature indicative output T, are also given.

As can be seen from the trace (B) of FIG. 5, the temperature indicative output of the resonance detecting sensor 10 provided at the point "b" exhibits marked reductions at both the engine speeds R1 and R2. Thus, by obtaining the first and second derivatives (see traces (C) and (D)), in essentially the same manner as was performed in connection with the sensor located at the point "a" in FIG. 4, it is possible to ascertain from the output of the sensor disposed at location "b" that resonance is occuring in the first central passage section 4.

In FIG. 6 the resonance frequencies and their relationship to the engine speed and the fluctuations of the output of the resonance detecting sensor 10 mounted on the first central passage section 4 at the point "c" are shown graphically. As in FIG. 4 the first and second derivatives T' and T" obtained for the temperature indicative output T, are also given.

As can be seen from the graph (B) of FIG. 6, the temperature indicative output of the resonance detecting sensor 10 provided at the point "c" exhibits marked reductions at both the engine speeds R1 and R2, in a manner which is similar to the sensor located at the point "b". Thus, again by obtaining the first and second derivatives (see traces (C) and (D)) it is possible to determine from the deviations of the second derivative T" from 0 that resonance is occuring at the location "c" at two different frequencies.

Figures 7A, 7B, 7C, 7D:
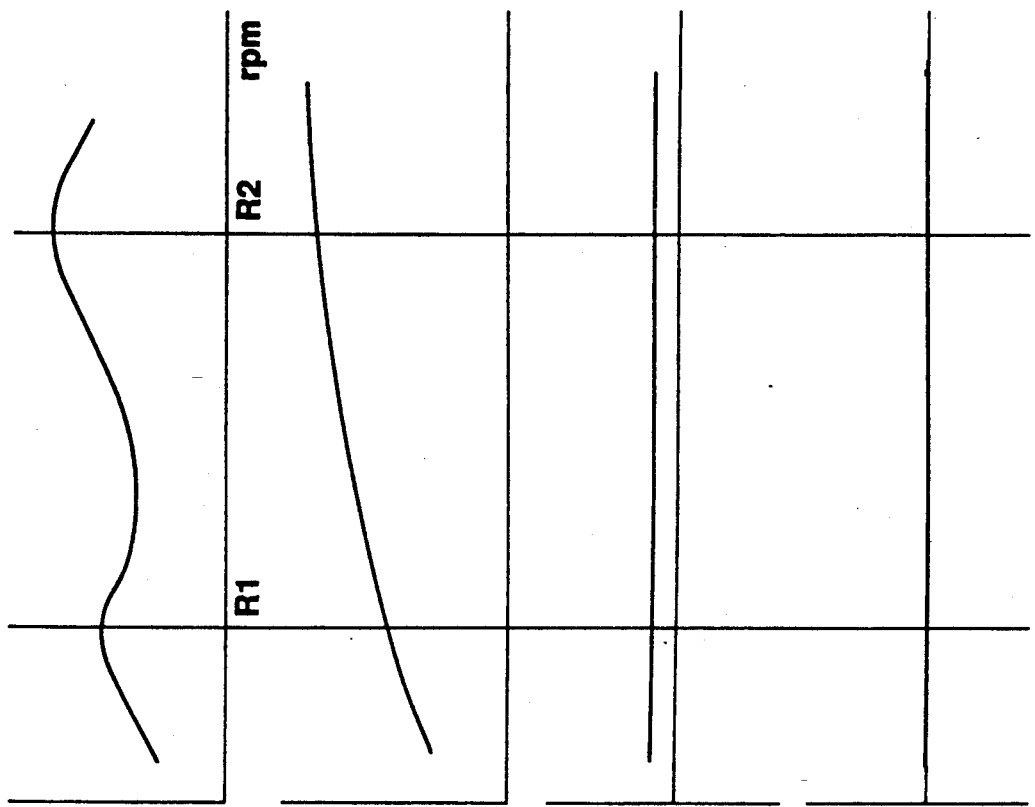
FIG. 7 is timing chart depicting the same set of parameters as the graphs of FIG. 4, for a resonance sensor according to first embodiment of the invention located which is exposed to an end node of a pressure wave in the exhaust passage.

FIG. 7 graphically shows, in terms of sound pressure level and engine speed, the fluctuations of the output of the resonance detecting sensor 10 mounted on the first central passage section 4 at the point "d".

The resonance detecting sensor 10 which is located at the point "d" was provided in order to demonstrate the principles of the invention. That is to say, it was provided to enable a contrast between its output and the outputs of the resonance detecting sensors 10 located at points "a", "b" and "c". As in FIG. 6, the first and second derivative values T' and T" are also derived from the temperature indicative output T.

As can be seen from trace (B) of FIG. 7, the temperature indicative output of the resonance detecting sensor 10 provided at the point "c" exhibits no sudden reductions at either of the engine speeds R1 and R2. The second derivative T' does not deviate from 0. The reason for this is that the sensor which is located at "d" is exposed to a pressure wave node and thus is not exposed to a pressure differential which will cause cooler air to be drawn over temperature responsive element the which occurs in the other sensors.

By the provision of the sensors at the respective positions "a", "b", "c", and "d" it is possible determine wether or not resonance is occurring within the first central passage section 4. Further, the sensor or sensors which are nearest the anti-node or anti-nodes of the pressure wave within the first central passage section 4 will exhibit the greatest temperature reductions. Accordingly, it is possible, by comparing the signal outputs of the above mentioned four resonance detecting sensors 10, to determine at which frequency the resonance is occurring.

Thus, in the sensing device according to the invention, by providing a plurality of resonance detecting sensors 10 and comparing their respective outputs it is possible to easily determine both whether the resonance is occurring, and at which frequency the resonance occurs. By this arrangement detection of resonance at a number of different frequencies becomes possible with a simple sensor arrangements whose construction is both inexpensive and durable.

In the above embodiment the resonance detecting sensors 10 have been disclosed as being provided in connection with the first central passage section 4 of the exhaust system. It will however be understood that the invention is not limited to such placements and that additional sensors may be provided in other sections of the exhaust system if so desired. For example, providing additional resonance detecting sensors 10 on the second central passage section 5 it is possible to provide a more accurate picture of the overall resonance characteristics of the exhaust system.

Figure 8:
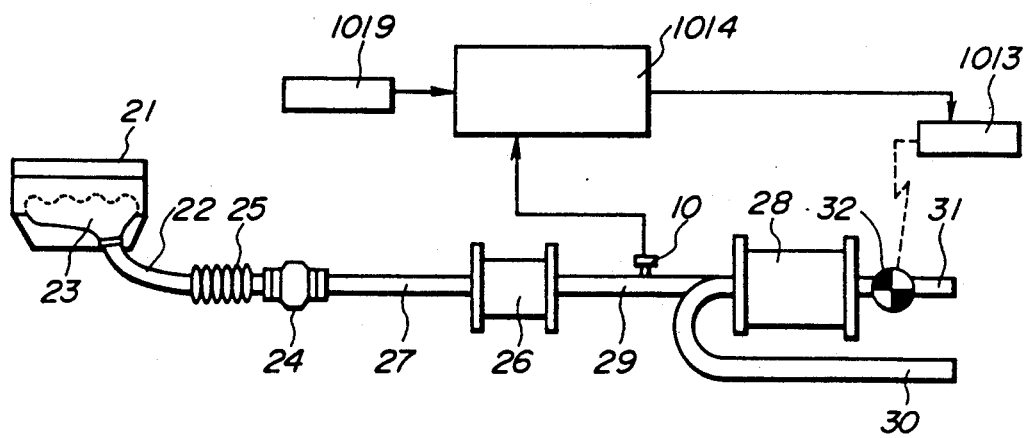
FIG. 8 is a schematic depiction of an exhaust system according to a second embodiment of the invention.
Figure 9A:
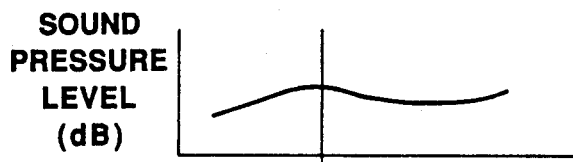
FIG. 9 is a timing chart showing the relationships between the engine speed, the sound pressure levels within the exhaust passage, the temperature indicative output of the sensor, first and second temperature signal derivatives and a control signal for controlling a changeover valve.
Figure 9B:
Figure 9C:
Figure 9D:
Figure 9E:
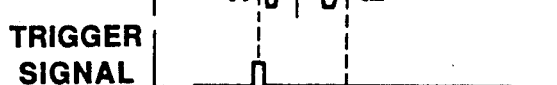
Figure 9F:

In FIG. 8 a second embodiment of an exhaust system, comprising a resonance detecting sensor 10 according to the invention, is shown. In the second embodiment, an internal combustion engine 21 is provided to which a front exhaust passage 22 is connected by way of a exhaust manifold 23. A catalytic converter 24 is connected to the front exhaust passage 22 by means of a flexible exhaust pipe section 25. At its downstream side the catalytic converter 24 is connected to a pre-muffler 26 by means of a first central passage section 27. The outlet of the pre-muffler 26 is connected to the upstream side of a second central passage section 29, by which it is coupled to a main muffler 28. The main muffler 28 has a long main tail pipe 30 and a shorter secondary tail pipe 31.

The secondary tail pipe 31 comprises a change over valve 32, by which it may be selectively opened or closed. The change over valve 32 is operable to open and close automatically by means of an electrical actuator 1013. The actuator 1013 may take the form of a solenoid, and is responsive to a control signal supplied thereto from the control unit 1014.

While the change over valve 32 is closed, the secondary tail pipe 31 becomes inactive and the exhaust gasses are expelled through the main tail pipe 30 only. On the other hand, while the change over valve 32 is open, the exhaust gasses are released via both the main tail pipe 30 and the secondary tail pipe 31. Thus, by the operation of the change over valve 32, the resonating characteristics of the exhaust system can be altered selectively.

In the second embodiment, a single resonance detecting sensor 10 is provided at a predetermined portion of the second central passage section 29. The position of the resonance detecting sensor 10 along the second central passage section 29 is selected such that it does not coincide with a location whereat a node of a pressure wave having a resonance frequency which commonly occurs within the second central passage section 29, tends to occur. For example, the resonance detecting sensor 10 is located at a position such that it is proximate the location where the first anti-node of the sound wave having the highest resonance frequency which tends to occur therein, tends to form.

With this arrangement, although when pressure waves having the lower resonance frequencies are produced, the resonance detecting sensor 10 will not be located precisely at a location whereat an anti-node tends to form, it will avoid the resonance detecting sensor 10 being located near a site where a pressure wave node tends to form.

The sensing output of the resonance detecting sensor 10 is supplied to the control unit 1014 is used to derive a control signal. The control signal which is output by the control unit 1014 drives the electrical actuator 1013 and controls the opening state of the change over valve 32. This facet of the invention will be set forth in greater detail hereinafter.

In addition to the temperature indicative signal output from the resonance detecting sensor 10, a signal from an engine crank angle sensor or the like engine rotational speed sensor 1019 associated with the internal combustion engine 21, is also supplied to the control unit 1014. The signal from the sensor 1019 is processed by the control unit 1014, in order to determine if the engine 21 is undergoing transient operation (viz., is undergoing acceleration or deceleration).

More specifically, the temperature indicative output of the resonance detecting sensor 10, provided on the second central passage section 29, is differentiated, as set forth in the first embodiment, and, in response to the detection of resonance, the change-over valve 32 is operated to switch from instant state. Viz., is induced to close from an open state or vice versa.

Although in this embodiment a single resonance detecting sensor 10 is provided, it will be understood that a plurality of resonance detecting sensors 10 may be used.

FIG. 9 shows a timing chart which is basically similar to those shown in FIGS. 4 through 7. The decibel level of the sound within the second central passage section 5 in relation to the engine speed, as well as the temperature signal of the temperature sensor 13 in relation to the engine speed, are shown along with the first and second derivatives T' and T" in traces (A), (B), (C), and (D). In trace (E), and (F) the pulses produced at the times t1 and t2 are shown in their positional relationship with respect to the trace (D). The trace given in FIG. 9 span only one engine speed R1.

As will be understood from a consideration of the relationship between the traces (D), (E), and (F), using the value T", the control unit 1014 generates first and second pulses. The leading edge of the first pulse occurs at t1 when the value of the second derivative T" deviates from zero while the second is generated at time t2 upon the said second derivative T" again assuming a zero value.

As the engine is accelerated, the first spike t1 occurs at the engine speed immediately preceding the resonance frequency associated with the engine speed R1 as shown in chart (E). Conversely, when the engine is decelerated, the spike t2 occurs at the engine speed immediately preceding the resonance frequency associated with the engine speed R1 as shown in chart (F).

In response to the spikes t1 and t2, the control unit 1014 outputs a control signal to the change over valve 32 of the nature which induces the same to switch the exhaust system to a different tuning.

In FIG. 10 the trace (A) shows the resonance characteristics of the exhaust system as the engine is accelerated. In this case the characteristics take the form of the sound pressure levels within the second central passage section 29, at the position of the resonance detecting sensor 10. The dotted line "i" indicates the sound pressure levels occurring at the various engine speeds while the valve 32 is closed. The solid line "o" indicates the sound pressure levels occurring at the various engine speeds while the change over valve 32 is open.

As can be seen from the trace (A), peak resonance frequencies occur no matter which of the exhaust modes is used. The difference between the modes comes in that the peak resonances are at different frequencies.

In this system the resonance detecting sensor 10 outputs a signal, by which the change over valve 32 is caused to switch between the open or closed position, each time a resonance begins to occur. Thus, before the resonance can reach its peak, the exhaust system changes and the level of noise of the exhaust is restricted.

In the trace (C) of FIG. 10 the sawtooth-like solid line indicates the sound pressure of the exhaust output of the engine as the change over valve 32 is controlled, in accordance with the operation set forth above in connection with FIG. 9, between the open and closed positions while the engine is accelerated. As can be seen this operation serves to significantly suppress the resonances occurring within the exhaust system as the engine is accelerated, thus minimizing the overall noise produced by the internal combustion engine 21.

It will be understood that via the use of the second embodiment, the noise produced by the internal combustion engine 21 during decelerating conditions, such as during engine braking can also suppressed in a similar manner.

Further, it will be understood that, although in the second embodiment the resonance characteristics of the exhaust system are altered by switching between tail pipes of alternate lengths, other embodiments will be readily conceivable to those skilled in the art, in which the resonance of the exhaust system is adjusted by the use of other mechanisms. For example, the resonance frequencies can be adjusted by altering the effective length of the tail pipe by opening valves which are disposed on its periphery.

The sensing means according to the instant invention provides an accurate indication of resonance occurring within a passage conducting a high pressure gas, by using sensors which are at once durable and inexpensive to produce. What is more, the invention achieves the above objects, with a device whose sensitivity to outside noise sources is practically nil.

In FIG. 11 an example of the resonance curves obtained in another experimental engine and exhaust system are given. In trace (A) the solid line "o" shows the sound pressure levels generated in the exhaust system as the engine is accelerated while the change over valve 32 is maintained at a first setting. The dotted line "i" shows the sound pressure levels generated in the exhaust system as the engine is accelerated while the change over valve 32 is maintained at a second setting. It will be noted that, unlike the exhaust system whose sound levels are plotted in FIG. 10, above a certain engine speed, i.e. in the range B, even when some resonance occurs, the sound pressure levels within the exhaust system occurring with the second setting, as indicated by the dotted line i, remain lower those of the first setting.

In view of this, during the development of the invention, it was found that it is preferable to determine, by experiment, if such a range occurs for the specific engine and exhaust arrangement. Where such a range is present, preferably the control unit 1014 is programmed so as to disregard the signal from the resonance detecting sensor 10, and to select the quieter of the two settings in response to the signal from the engine revolution counter 1019, entering the predetermined range.

As shown in trace (B) the trigger signal output from the control unit 1014 does not occur at the range R4 or above. The solid black line "h" of the graph (C) illustrates the sound pressure levels of an exhaust system controlled in accordance with the above operation.

In the embodiments given so far, the resonance chamber 11 was employed to cool a portion of the gas in the exhaust system in order to provide the temperature drop at the position of the temperature sensor 13. Hereinafter, embodiments of the invention are disclosed wherein the temperature sensor is provided at a portion of the gas passage whereat a heating or a cooling means is provided within the passage itself.

In the embodiments of the invention given hereinafter there is also a difference in that, the position of the sensor is selected to be near the node of the sound wave of the resonance frequency to be monitored, rather than at the anti-node as in the previous embodiments. The sensor disposed at the node is therefore positioned such that, when the resonance occurs within the passage to be monitored, the gas flow within the passage moves in both axial directions of the passage. By providing a heating or a cooling element at either the downstream or the upstream side of the temperature sensing element, the portion of the gas effected by the heating or cooling element is brought into contact with the temperature sensing element to a degree which is determined according to the resonating condition within the passage. Thus, again the temperature sensing element becomes effective for detecting the resonating conditions within the passage.

Figure 12:
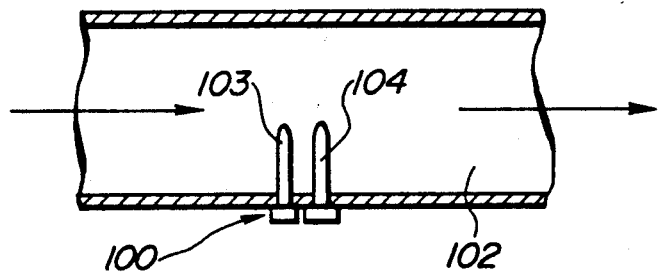
FIG. 12 is a cross-sectional view of a portion of an exhaust passage in which resonance sensor according to a third embodiment of the invention is disposed.

In FIG. 12 a third embodiment of resonance detecting sensor according to the invention is shown. The resonance detecting sensor 100 according to the third embodiment consists of a temperature sensor 103, formed from a thermistor or thermocoupling device, disposed proximate the location where a node of a pressure wave occurs within the exhaust passage 102. An electrical heating element 104 is provided in the near vicinity of the temperature sensor 103. In this instance, the electrical heating element 104 is arranged to be downstream of the temperature sensor 103, with respect to the flow direction, indicated by the arrows in FIG. 12, of the exhaust gas within the exhaust passage 102. The electrical heating element 104 is constantly kept at a temperature that is higher than that of the gasses flowing within the passage.

Under conditions wherein no resonance occurs within the exhaust passage 102, the influence of the electrical heating element 104 on the temperature detected by the temperature sensor 103, is so slight as to be insignificant. Therefore, under these conditions, the temperature indicated by the temperature sensor 103 is determined solely by the temperature of the exhaust gases from the engine passing through the exhaust passage 102.

Figure 13A:
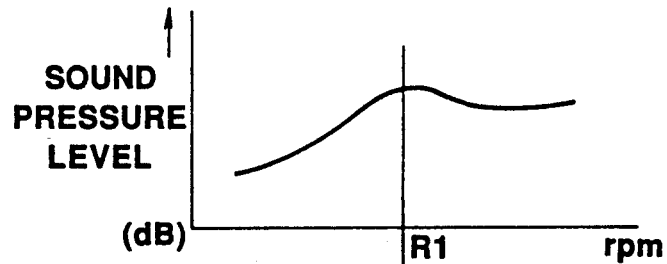
FIG. 13 shows graphically the relationship between sound pressure levels within the exhaust system at various engine speeds and the signal output of the sensor according to the third embodiment of the invention.
Figure 13B:
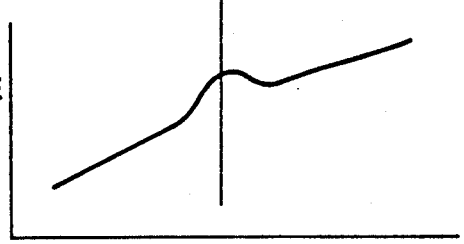

As the engine is accelerated, the temperature within the exhaust passage 102 gradually increases in direct proportion to the engine speed. During this period, as has been mentioned above in connection with the previous embodiments, at the engine speed R1 a resonance frequency occurs in the exhaust passage 102. This resonance frequency is indicated by the peak in the line of the graph (A) of FIG. 13.

Since the temperature sensor 103 and the electrical heating element 104 are located proximate a pressure wave node, upon the resonance frequency occurring at the engine speed R1, the flow of gas at the position of the resonance detecting sensor 100 is no longer limited to a single direction. Therefore, during the brief periods when the gas flows in the direction opposite the arrows of FIG. 12, the heat from the electrical heating element 104 is carried by the exhaust gasses to the temperature sensor 103, causing the output thereof to increase. Similarly, during deceleration of the engine, when the engine speed R1 is reached, the output of the temperature sensor 103 increases as a result of the resonance within the exhaust passage 102.

Thus, as in the previous embodiments, the rapid fluctuations in the temperature indicative output of the temperature sensor 103 are indicative of resonance within the exhaust passage 102. With the resonance detecting sensor 100 is possible to detect the occurrence resonant frequencies before they reach their peak.

Figure 14:
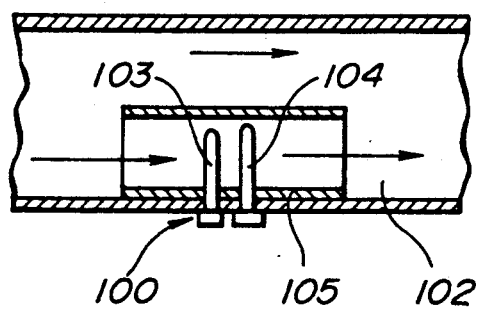
FIGS. 14 and 15 are cross-sectional views of a sensor arrangement according to a fourth embodiment of the invention.
Figure 15:
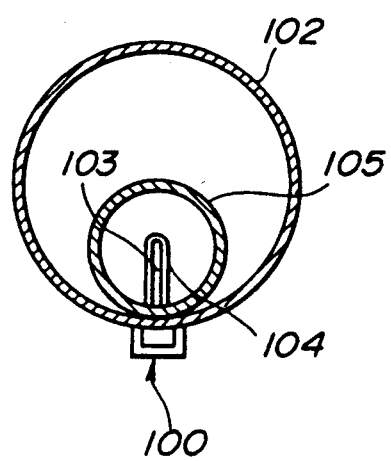

In FIGS. 14 and 15 a fourth embodiment of sensing apparatus according to the invention is shown. In the fourth embodiment, the resonance detecting sensor 100 is essentially identical to that of the third one. The difference lies in that, in the fourth embodiment, an internal sensing passage 105 is defined by a tube disposed within the exhaust passage 102. The temperature sensor 103 and the electrical heating element 104 defining the resonance detecting sensor 100 are arranged to project into the internally arranged sensing passage 105.

With this arrangement the internal sensing passage 105 serves to restrict the area within which the heat output of the electrical heating element 104 can dissipate. Due to this reduction in the size of the area effected by the electrical heating element 104, when resonance occurs within the exhaust passage 102, more of the heat from the electrical heating element 104 becomes concentrated on the temperature sensor 103. Thus, the overall sensitivity of the resonance detecting sensor 100 is enhanced by the internal sensing passage 105.

Figure 16:
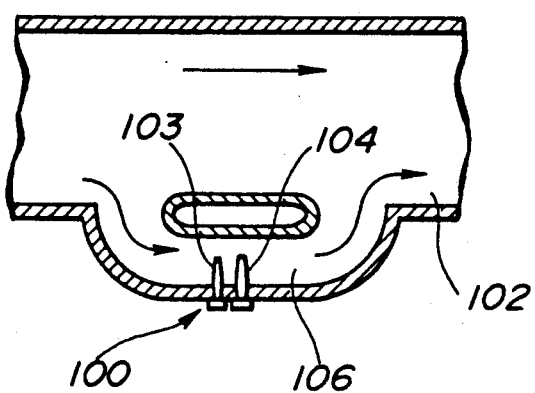
FIG. 16 is a side elevation cross-sectional view of a sensor arrangement according to a fifth embodiment of the invention.

In a fifth embodiment of the invention, shown in the cross-section in FIG. 16, an external sensing passage 106 is provided on the exhaust passage 102. The external sensing passage 106 extends substantially parallel to the exhaust passage 102 and is coupled thereto at either end, such that a portion of the exhaust gasses flowing through the exhaust passage 102 are diverted, so as to pass through the external sensing passage 106 in a direction parallel to the direction of the gas flow within the main passage. The temperature sensor 103 and the electrical heating element 104 comprising the resonance detecting sensor 100, are arranged to project within the external sensing passage 106.

With this arrangement, the resonance detecting sensor 100 is partially isolated from the full force of the gas flow within the exhaust passage 102. In this way, the resonance detecting sensor 100 is protected from the corrosive effects which tend to occur in the case it is disposed in the direct path of the hot exhaust gasses. In other words, the resonance detecting sensor 100 is also protected from the possible damage resulting from shock waves generated by backfiring of the engine and from impacts with particles of solid materials carried through the exhaust passage 102 along with the flow of exhaust gasses.

Further, as in the fourth embodiment, the sensitivity of the resonance detecting sensor 100 is improved by the external sensing passage 106 both due to the fact that the electrical heating element 104 heats a smaller area and can thus concentrate more heat on the temperature sensor 103, and in that the overall temperature within the external sensing passage 106 is somewhat reduced relative to the temperature within the exhaust passage 102. The result of this reduction in temperature is a larger difference between the temperature of the gas heated by the electrical heating element 104 and the gasses in the external sensing passage 106. This increases the sensitivity of the resonance detecting sensor 100.

Figure 17:
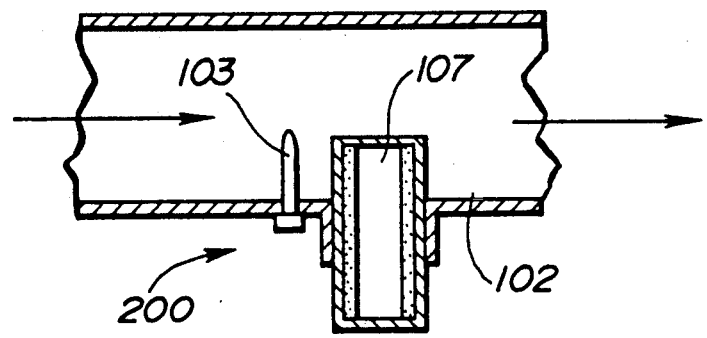
FIG. 17 is a side elevation cross-sectional view of a sensor arrangement according to a sixth embodiment of the invention.

In the resonance detecting sensor 200 formed according to the sixth embodiment of the invention, shown in cross-section in FIG. 17, the heating element is replaced by a cooling element, which in this instance takes the form of a heat pipe 107.

The heat pipe 107 is disposed with the exhaust passage 102 in a manner such that one end projects into the exhaust passage 102 at essentially the position occupied by the electrical heating element 104 of the previous three embodiments. The other end of the heat pipe 107 projects out of the exhaust passage 102 so as to be in contact with the ambient atmosphere. The effect of the heat pipe is to transfer heat from the interior of the exhaust passage 102 into the surrounding atmosphere. Through this exchange of heat, that portion of the heat pipe 107 projecting within the exhaust passage 102 in the vicinity of the temperature sensor 103, becomes relatively cool.

With this arrangement, the effect of the heat pipe 107 on the temperature indicative output of the temperature sensor 103 of the resonance detecting sensor 200 essentially mirrors the effect incurred thereon by the electrical heating element 104 of the previous three embodiments. In other words, when resonance occurs within the passage, the temperature indicative output of the temperature sensor 103 drops.

This embodiment has the advantage over the previous three, in that all of the elements comprising the resonance detecting sensor 200 are passive, and therefore draw no energy. This embodiment also has the advantage that there is less wear on the elements due to the effects of heat.

It will be noted that, although in the drawing the heat pipe is shown as being disposed downstream of the temperature sensor 103, embodiments are also easily conceivable in which it is disposed at the upstream side of the temperature sensor 103. In such an embodiment the heat pipe under nonresonating conditions would cool the temperature sensor 103 and resonance within the exhaust passage 102 would cause the output of the temperature sensor 103 to rise.

Figure 18:
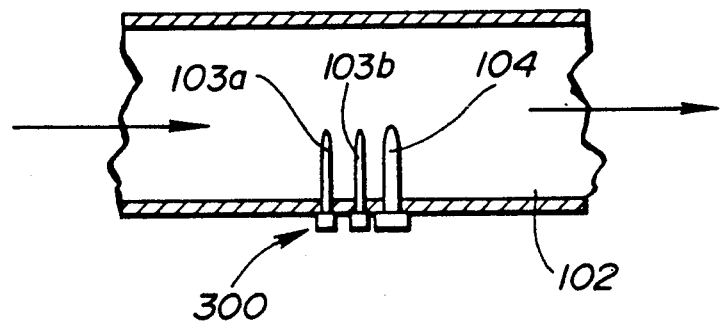
FIG. 18 is a side elevation cross-sectional view of a sensor arrangement according to a seventh embodiment of the invention.

In the resonance detecting sensor 300 according to the seventh embodiment of the invention shown in FIG. 18, a pair of temperature sensors are provided within the exhaust passage 102 at the upstream side of the electrical heating element 104 with respect to the flow of exhaust gasses.

The first temperature sensor 103a is disposed nearest to the electrical heating element 104, while the second temperature sensor 103b is disposed slightly upstream of the first temperature sensor 103a.

With this arrangement a small magnitude of resonance within the exhaust passage 102 causes only the temperature of the first temperature sensor 103a to rise. On the other hand, resonances of larger magnitudes cause the temperatures of both the first temperature sensor 103a and the second temperature sensor 103b to rise. Thus, it is possible, not only to determine whether the resonance is occurring within the exhaust passage 102, but also to determine the magnitude of the resonance occurring within the exhaust passage 102.

It will be understood that for finer determinations, embodiments are conceivable wherein a still greater number of temperature sensors are employed.

Figure 19:
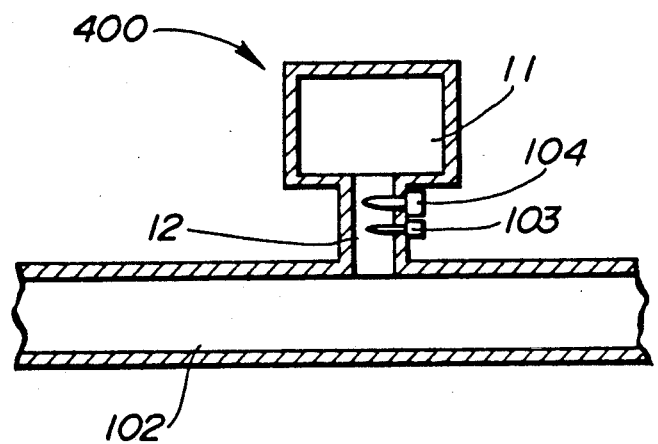
FIG. 19 is a side elevation cross-sectional view of a sensor arrangement according to a eighth embodiment of the invention.

In the eighth embodiment of the invention shown in FIG. 19, the resonance detecting sensor 400 combines elements of the resonance detecting sensor 10 of the first embodiment, and of the resonance detecting sensor 100 of the third embodiment. In this embodiment the electrical heating element 104 has been disposed, in the vicinity of the temperature sensor 13, within the resonance chamber connector passage 12. As in the first embodiment, the sensor becomes effective to output a signal, in the form of a sudden change in the temperature signal of the temperature sensor 13, when resonance in the exhaust passage 102 causes the rapid movement of gases through the resonance chamber connector passage 12.

It will be noted that, although in the shown embodiment the electrical heating element 104 is at the side of the temperature sensor 13 closest to the resonance chamber 11, embodiments wherein this relationship is reversed would also be effective in producing the fluctuations in the output of the temperature sensor 13 in response to resonance occurring in the exhaust passage 102.

The resonanced detecting sensor 400 may be used as a direct replacement for the resonance detecting sensor 10, in the arrangement shown in FIG. 8, in order to obtain essentially identical results.

Figure 20:
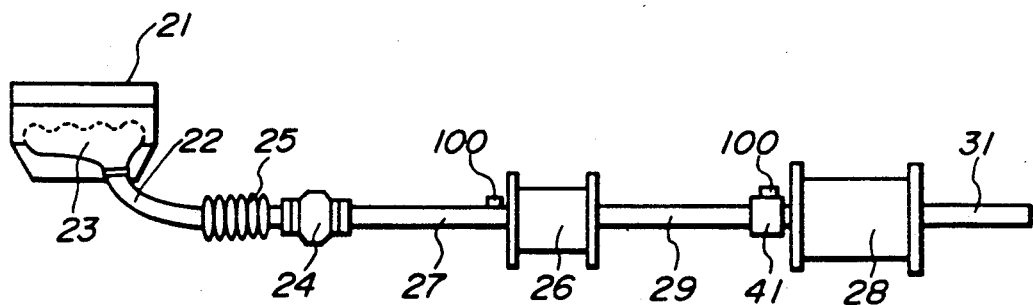
FIG. 20 is a schematic depiction of resonance suppression system according to a ninth embodiment of the invention.
Figure 21:
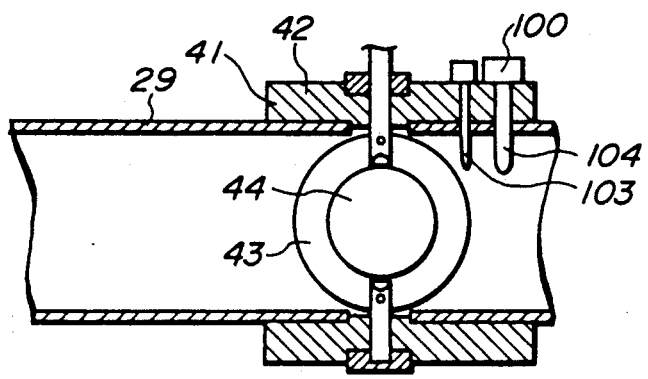
FIG. 21 is a side elevation cross-sectional view of a variable flow restrictor assembly arrangement according to a the ninth embodiment of the invention.

A ninth embodiment of the invention is shown in FIGS. 20 and 21. A pair of the resonance detecting sensors 100 is incorporated in a resonance suppression system for an internal combustion engine. The parts which have appeared in previous embodiments of the invention bear identical reference numerals and for the sake of brevity, a detailed description thereof will be omitted.

The resonance suppression system of the ninth embodiment, shown in FIGS. 20 and 21 is essentially similar to that of the second embodiment, except for the following aspects.

Since the resonance detecting sensors 100 are employed in the ninth embodiment, they are placed at one end of each of the first central passage section 27 and the second central passage section 29 respectively, rather that at the central sections thereof.

It will be noted that in this respect the resonance detecting sensors 100 have an advantage over those which employ the resonance chamber 11, in that, since they are essentially effective when located at the nodes of the sound waves within the passages, it is not difficult to locate them in such a manner as to be sensitive to all resonant frequencies occurring in the respective exhaust passage sections, since any resonant frequency for the passage will have nodes located at the ends of the passage.

As variable flow restrictor assembly 41 is provided at the end of the second central passage section 29, whereat it is coupled to the inlet of the main muffler 28.

As can be seen best in FIG. 21, which is a cross-sectional view of the variable flow restrictor assembly 41, the variable flow restrictor assembly 41 comprises an annular valve casing 42, which is provided at the end of the second central passage section 29.

The annular valve casing 42 houses an annular butterfly valve 43, in such a manner as to be rotatable about an axis that intersects the central axis of the second central passage section 29, at a substantially right angle thereto. The annular butterfly valve 43 comprises a restrictor orifice 44 formed at the center. The annular butterfly valve 43 is operable between a full open position, wherein the flow of gasses through the passage is unrestricted, and a closed position wherein the flow of gasses at the position of the node is restricted.

The restriction of the flow of gasses by the annular butterfly valve 43 serves to alter the resonance characteristics of the exhaust system in a manner which is essentially similar to that achieved by switching the change over valve 32 of the second embodiment between the open and closed positions. Thus the peaks and valleys of the resonant frequencies of the exhaust system when the annular butterfly valve 43 is open, are nearly one hundred and eighty degrees out of phase with those occurring when the annular butterfly valve 43 is closed.

In this embodiment, the signals from the resonance detecting sensors 100 are processed so as to obtain a signal for opening and closing the annular butterfly valve 43, in a manner which is essentially similar to that in which the change over valve 32 in the second embodiment is operated, in order to suppress the resonant frequencies occurring in the exhaust system.

Figure 22:
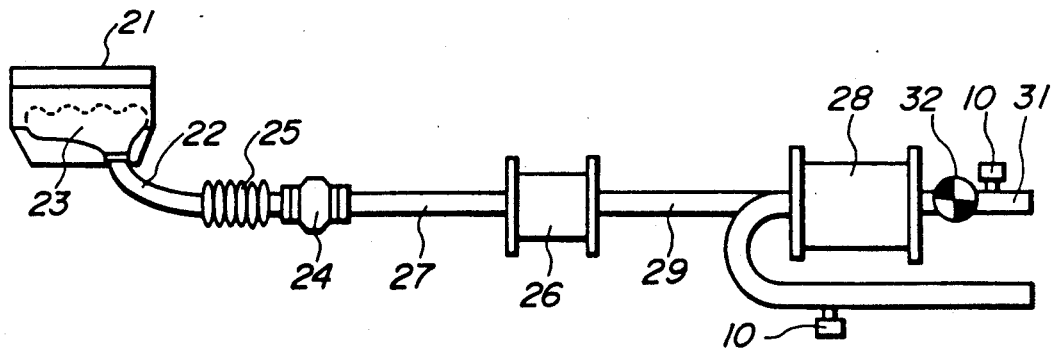
FIG. 22 is a schematic view of resonance suppression system according to a tenth embodiment of the invention.

In the tenth embodiment of the invention, shown in FIG. 22, the general arrangement of the exhaust system is basically similar to that of the second embodiment. The tenth embodiment however differs from the second one mainly in that a pair of resonance detecting sensors 10 are provided. One of the resonance detecting sensors 10 is mounted on the main tail pipe 30. The other of the resonance detecting sensors 10 is mounted on a portion of the secondary tail pipe 31 which is downstream of the change over valve 32. Thus, while the change over valve 32 is at a setting in which the secondary tail pipe 31 is inactive, the gasses within the resonance chamber 11 of the resonance detecting sensor 10 become quite cool, so that when the change over valve 32 is returned to the setting in which the secondary tail pipe 31 is active, the sensitivity of the resonance detecting sensor 10 associated therewith is increased. Similarly, while the change over valve 32 is open, the flow of exhaust gasses to the main tail pipe 30 is reduced with the result that the sensitivity resonance detecting sensor 10 associated therewith is particularly high when the system is switched back to the mode wherein only the main tail pipe 30 is active.

Figure 23:
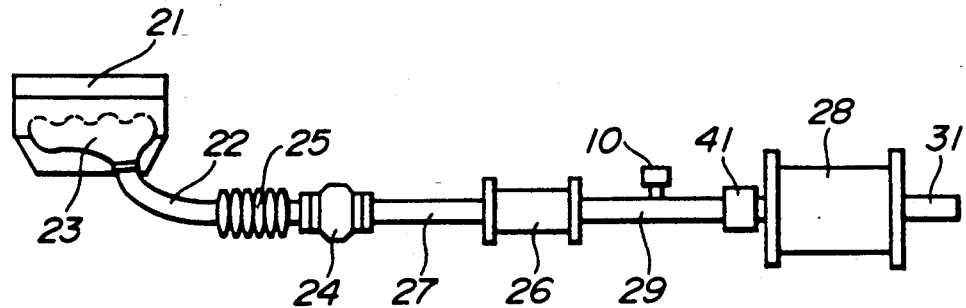
FIG. 23 is a schematic view of resonance suppression system according to an eleventh embodiment of the invention.

In the eleventh embodiment of the invention shown in FIG. 23, the arrangement of the exhaust system is again basically similar to that of the second embodiment. The eleventh embodiment differs from the second embodiment in that a variable flow restrictor assembly 41 is mounted at the outlet of the second central passage section 29, in place of the change over valve 32 provided on the secondary tail pipe 31 in the second embodiment.

As has been described above in connection with the ninth embodiment, the variable flow restrictor assembly 41 functions to alter the tuning of the exhaust system, by restricting the flow of exhaust gasses at the node of the sound wave within the second central passage section 29. Therefore, in the eleventh embodiment of the invention, the provision of the multiple tail pipes becomes unnecessary, and the overall size of the exhaust system is advantageously reduced.

In the embodiments of the invention mentioned thus far, either a heating means or a cooling means has been added on to the exhaust system in the vicinity of the temperature sensors 13 and 103. It will be noted that, although these heating and cooling means are small, inexpensive and are relatively easy to produce and mount, they do, none the less, represent added expense and labor in the construction of the exhaust system. In the development of the invention the inventors sought to provide an embodiment wherein the extraneous heating or cooling means were rendered unnecessary.

It was discovered, during the experiments conducted in connection with the invention, that when the engine is cool, the temperatures within the smaller diameter portions of the exhaust circuit, increase at a higher rate than the temperatures within the relatively larger diameter portions, such as the catalytic convertor, and mufflers. This is due to the fact that the inner volumes of the catalytic convertor and mufflers are larger than those of the exhaust passages. Under these conditions, when the engine is accelerated, a pronounced temperature differential develops, between the gasses in the chamber and those of the passage, at the point where the in exhaust passage enters the larger chamber.

When resonance occurs in the exhaust passage under the above conditions, as in the previous embodiments, there is drop in overall temperature at the outlet of the exhaust passage. This is due to the fact that, during the brief periods of negative pressure at the outlet of the exhaust passage, the cooler gasses in the larger chamber are drawn partially into the outlet of the exhaust passage.

It was surmised that, by placing a temperature sensor at the outlet of an exhaust passage where it connected to the inlet of a muffler or catalytic convertor the resonance could be detected using the pressure differentials between the exhaust system elements and without the need to provide an added heating or cooling means.

Figure 24:
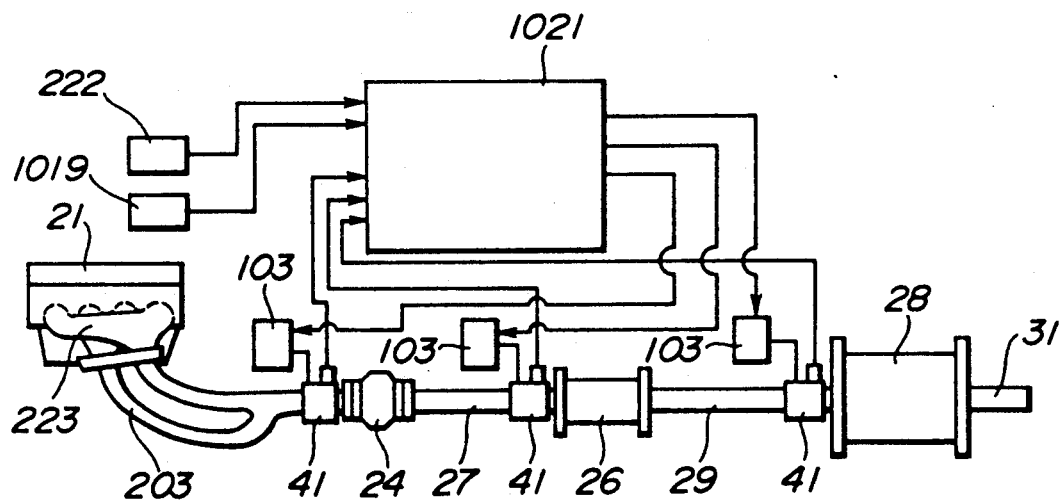
FIG. 24 is a schematic view of resonance suppression system according to a twelfth embodiment of the invention.
Figure 25:
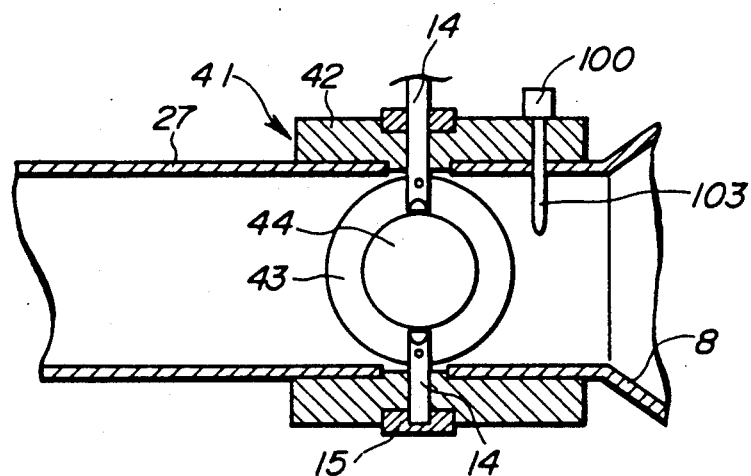
FIG. 25 is a side elevation cross-sectional view of a variable flow restrictor assembly arrangement according to a twelfth embodiment of the invention.

A twelfth embodiment of the invention is shown in FIGS. 24 and 25. In the twelfth embodiment the internal combustion engine 21 has a dual exhaust manifold 223 which is coupled to the catalytic converter 24 by means of a bifurcated front exhaust passage 203. As in the previous embodiments, the first central passage section 27 is connected to the outlet of the catalytic converter 24 and is connected to the tail pipe 6 through the pre-muffler 26, the second central passage section 29 and the main muffler 28. As in the previous embodiments, these elements define an exhaust circuit by which exhaust gasses expelled by the internal combustion engine 21 are conducted to the tail pipe opening 6a.

In addition to being connected to each of the three temperature sensors 103 for receiving temperature derived signals therefrom, the control unit 1021 of the twelfth embodiment is connected to the exhaust system, and is also operatively connected to a throttle valve opening angle sensor 222 and an engine revolution counter 1019. The respective signal outputs of the throttle valve opening angle sensor 222 and the engine revolution counter 1019, are processed by the control unit 1021 so as to derive the engine accelerating condition and the engine load.

The catalytic converter 24, the pre-muffler 26, and the main muffler 28 of the exhaust circuit share the common feature that they define chambers of relatively large cross-sections. These are located at the outlet ends of the bifurcated front exhaust passage 203, the first central passage section 27, and the second central passage section 29 respectively.

Variable flow restrictor assemblies 41, are mounted at the respective junctures where the outlets of the bifurcated front exhaust passage 203, the first central passage section 27, and the second central passage section 29, connect to the inlets of the catalytic converter 24, the pre-muffler 26, and the main muffler 28.

As shown in FIG. 25 the variable flow restrictor assemblies 41 comprise annular butterfly valves 43 having restrictor orifices 44. The annular butterfly valve 43 is rotatably mounted on the variable flow restrictor assembly 41, by way of a butterfly valve bushing 15 which receives a butterfly valve journal pin 14.

Each of the annular butterfly valves 43 is rotatable about an axis defined by the butterfly valve journal pins 14 by means of an independently controlled electrical actuator 1013 for variably restricting the flow of gasses within the respective passage sections. The temperature sensors 103 are mounted so as the project into the flow of exhaust gasses at the downstream sides of the respective variable flow restrictor assemblies 41.

Thus, in the twelfth embodiment of the invention, as in the ninth embodiment, the temperature sensor 103 is placed near the sound wave nodes which tend to occur at the ends of the exhaust pipe sections which connect to the inlets of the mufflers and of the catalytic converter.

The twelfth embodiment differ from the previous embodiments in that no heating or cooling means is provided in the vicinity of the temperature sensor 103. Instead the temperature differential existing between the smaller diameter exhaust passages and the larger diameter elements are used to advantage in order to obtain the fluctuation in the temperature signal of the temperature sensors 103 indicating resonance.

The control unit 1021, as has been mentioned above, receives the signal output of the engine revolution counter 1019, which it processes in order to discern whether or not the engine 21 is in an accelerating condition. The control unit 1021 also processes the signal outputs of the respective temperature sensors 103 to determine whether or not resonance is occurring at the positions of any of the respective temperature sensors 103.

Unlike the previous embodiments, wherein the control unit 1021 was operable simply to output a signal for changing the opening state of the change over valve 32 or the variable flow restrictor assembly 41 whenever resonance occurred, regardless of the current opening or closing condition of the valve, the control unit 1021 has a default feature whereby, when it detects that the engine is accelerating, it holds the respective annular butterfly valves 43 in an open condition until resonance is detected. In this manner, the back pressure in the exhaust system produced as a result of the increased resistance to the flow of exhaust gasses, resulting from closure of the butterfly valves, is kept to a minimum.

This minimization of back pressure serves to maximize the energy output of the engine during acceleration, improving the overall performance of the vehicle in which the engine is mounted, as well as improving the fuel efficiency.

Figure 26:
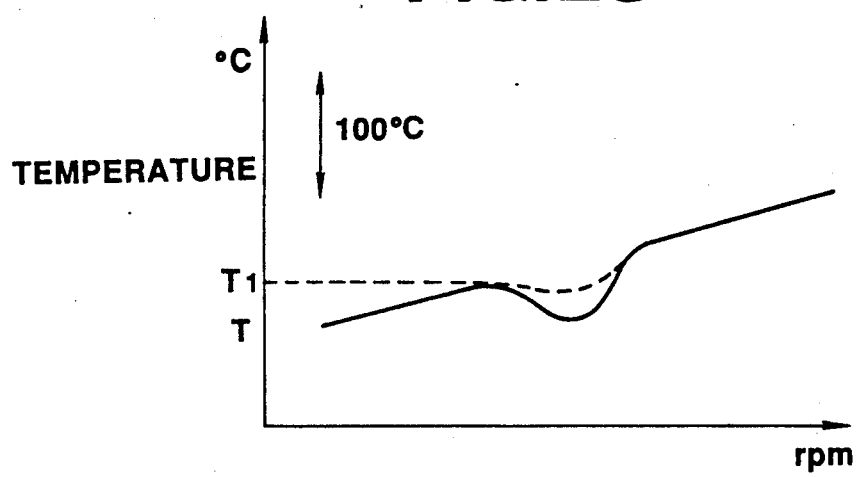
FIG. 26 is a graph showing the relationship between the temperature signal and the engine speed.

When the engine 21 is in a non-transitory operating state, such as when it is idling, or operating at a relatively low steady output, the overall temperature of the gasses within the exhaust system remains relatively low. When the internal combustion engine 21 is accelerated from such a condition, the temperature indicative outputs of the respective temperature sensors 103 increase, proportionally to the engine speed, in a manner similar to that indicated by the graph shown in FIG. 26. Under these conditions the rate of increase in the temperatures within the catalytic converter 24, the pre-muffler 26 and the main muffler 28 are relatively slow in comparison to the rates of temperature increase within the respective connecting passages 203, 27, and 29. Thus, a well defined temperature differential occurs between the temperatures at the interiors of the elements 24, 26, and 28, and the passages 203, 27, and 29 during acceleration of the engine.

Figure 28:
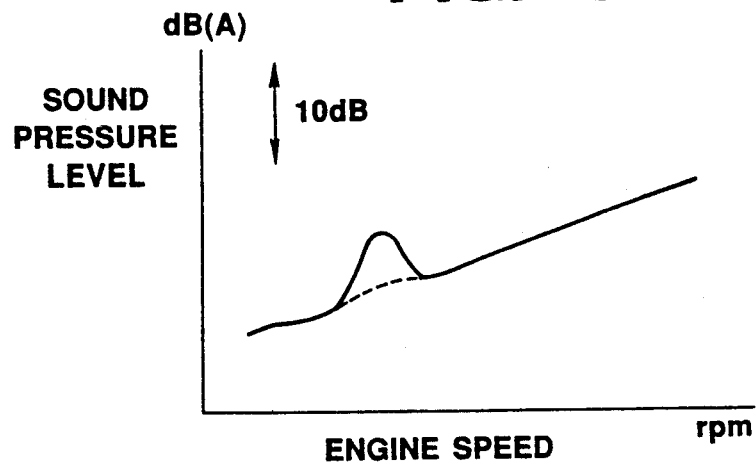
FIG. 28 is a graph showing sound pressure levels at various engine speeds.

As has been set forth above, as the engine is accelerated, if the annular butterfly valves 43 are left open, a resonance peak occurs, producing a sudden increase in the sound pressure levels within the exhaust system, as indicated by the solid line of FIG. 28. Under such a condition, the exchange of gasses within the exhaust passage and the connected chamber, at the position of the associated temperature sensor 103 produce the temperature drop in the output of the temperature sensor 103 indicated by the solid line of FIG. 26.

The control unit 1021 is responsive to the sudden drop in the output of the temperature sensor 103 to activate the electrical actuator 1013 to close the annular butterfly valve 43, and thus to alter the tuning of the associated passage as set forth in connection with the previous embodiments. As a result of the operation of the annular butterfly valve 43 in response to the detected resonance, the sound pressure levels are reduced in a manner similar to that disclosed in connection with the previous embodiments.

Figure 27:
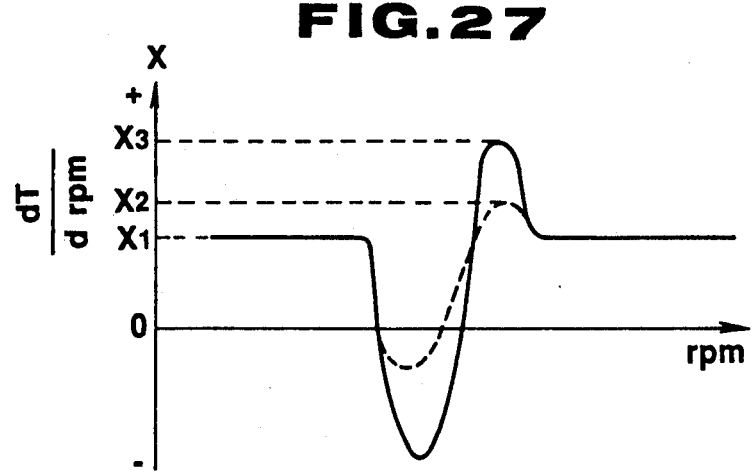
FIG. 27 is a graph depicting a first temperature signal derivative.

In the control operation performed by the control unit 1021, when an increase in the opening angle of the throttle valve is detected, it is deemed that the engine speed is increasing. Differential calculations are continuously performed using the signal derived from each temperature sensor 103 to obtain a derivative $X(X=dT/drpm)$ as indicated in the graph shown in FIG. 27. While the engine is accelerating and there is no resonance occurring in the vicinity of the temperature sensor, the differential value remains at a relatively constant level ($X1$). The differential value $X1$ is memorized by the control unit 1021.

When a resonance node occurs near the temperature sensor 103, the resulting drop in the temperature signal results in the differential value falling below a threshold value 0. At this point the annular butterfly valve 43 is closed thus eliminating the resonance node occurring near the temperature sensor 103.

Thereafter, since the temperature sensor 103 is no longer subject to cooling by the relatively cool gasses from within the chamber associated therewith, the temperature signal returns rapidly to the level corresponding to the increase in the overall temperature of the exhaust gasses resulting from the increasing engine speed. While the temperature indicative output increases the differential value reaches a peak value X2 whereafter it returns to a relatively steady rate of increase. When the steady increase rate is resumed, the differential value X1 is reached, at which time the control unit 1021 energizes the electrical actuator 1013 to reopen the annular butterfly valve 43.

Thus, in this embodiment, rather than monitoring the temperature sensor 103 for the recurrence of resonance while the annular butterfly valve 43 is closed and opening it only in response to the recurrence of resonance, while the engine is accelerating, the annular butterfly valve 43 is opened whenever it is judged that there is no resonance occurring within the exhaust passage. In this manner, the back pressure in the dual exhaust manifold 223 caused by resistance to the flow of exhaust gasses within the exhaust system, can be kept to a minimum.

Another conceivable control operation in a control unit according to the twelfth embodiment, would be to memorize the temperature value T1 at the time when the annular butterfly valve 43 is operated to close. Thereafter, when the temperature indicative output of the temperature sensor 103 exceeds the value T1, the valve is reopened.

Figure 29:
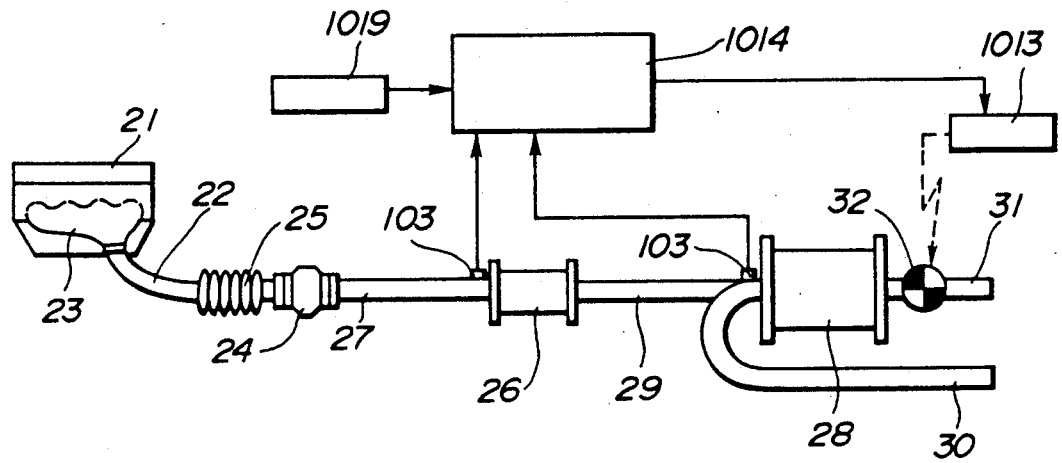
FIG. 29 is a schematic depiction of an exhaust system according to a thirteenth embodiment of the invention.
Figure 30:
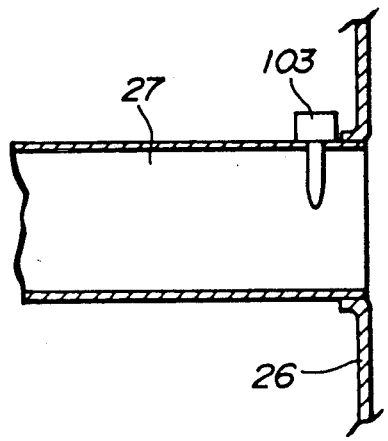
FIG. 30 is a cross-sectional view in which the sensor according to the thirteenth embodiment of the invention is shown.

In a thirteenth embodiment of the invention shown in FIGS. 29 and 30, the temperature differential existing between the first central passage section 27 and the second central passage section 29 with respect to the increased diameter interior chambers defined by the pre-muffler 26, and the main muffler 28, are used to cool the temperature sensor 103, in order to produce the fluctuations in the temperature signal of the temperature sensor 103 which is indicative of resonance within the exhaust system.

To produce this result, the temperature sensors 103 are placed near the outlet ends of the first central passage section 27 and the second central passage section 29, where they are respectively connected to the pre-muffler 26, and the second central passage section 29.

The signal outputs of the temperature sensors 103 are supplied to a control unit 1014, which is essentially similar to that of the second embodiment. Except for the fact that the resonance sensors are comprised only of the temperature sensors 103 placed at the ends of the passages, the thirteenth embodiment is identical to the second embodiment of the invention. Therefore, for sake of brevity of disclosure, further details of construction and operation of the resonance suppression device according to the thirteenth embodiment of the invention shall be omitted.

What is claimed is:

1. A resonance suppression device for an internal combustion engine comprising:
   an exhaust system, said exhaust system including a passage coupled to an exhaust outlet of an internal combustion engine for directing a flow of exhaust gasses expelled by said internal combustion engine;
   tuning means for selectively altering a frequency at which gas in said exhaust system resonates;
   a resonance detecting means, said resonance detecting means including a resonating chamber which is connected by a connector passage to said passage at a portion whereat an anti-node of a sound wave of said resonant frequency occurs, and a temperature sensor, said temperature sensor being disposed in said connector passage; and
   control means, said control means being responsive to a signal output of said resonance detecting means for switching said tuning means in a manner which alters a resonance frequency of said exhaust system upon the detection of resonance by said resonance detecting means.

2. A resonance detection device comprising:
   a passage for conducting a flow of gas;
   temperature detecting means for detecting the temperature of said gas in said passage at a portion of said passage whereat the gas within said passage flows in both axial directions of said passage as a result of resonance occurring within said passage; and
   heat exchange means disposed within said passage in the near vicinity of said temperature detecting means for altering the temperature of gas proximate said temperature sensing means in response to resonance occurring in said passage.

3. In a resonance suppression device for an exhaust system of an automotive vehicle;
   a chamber, said chamber being in fluid communication with a first exhaust pipe section which supplies exhaust gases thereinto, and a second exhaust pipe section which exhausts exhaust gases therefrom, said camber having a cross-sectional area different than a cross-sectional area of said exhaust pipe sections;
   a variable flow restricting means disposed in the first exhaust pipe section for selectively restricting said flow of exhaust gases into the chamber; and
   temperature sensing means, said temperature sensing means being disposed in the first exhaust pipe section in vicinity of said variable flow restricting means, said temperature sensing means producing an electric temperature indicative signal which is used to control the variable flow restricting means.

4. A resonance detecting device as set forth in claim 4 wherein said chamber is defined by a portion of an exhaust passage of an internal combustion engine.

5. An exhaust system for an internal combustion system comprising:
   an exhaust passage for conducting exhaust gases of said internal combustion engine;
   exhaust passage tuning means, said exhaust passage tuning means being operable for altering the resonating frequency of said exhaust passage;
   temperature sensing means, said temperature sensing means being disposed within said exhaust passage for detecting the temperature of gases within said exhaust passage at a point defined in the vicinity of a resonance node of a sound wave occurring in said passage and outputting an electric temperature signal indicative thereof; and
   electronic control means, said electronic control means being responsive to fluctuations in said temperature indicative signal for deriving a control signal which is supplied to said exhaust passage tuning means.

6. A resonance detecting device comprising:
   a passage through which gases flow, said passage having a first portion having a first cross-sectional area, and a second portion having a second cross-sectional area which is larger than the first cross-sectional area, said first and second portions being directly connected to one another; and
   temperature sensing means, said temperature sensing means being disposed in said first portion at a location which is proximate the second portion, wherein a heating means is disposed in said first portion in the vicinity of said temperature sensor.

7. A resonance detecting device comprising:
a passage through which gases flow, said passage having a first portion having a first cross-sectional area, and a second portion having a second cross-sectional area which is larger than the first cross-sectional area, said first and second portions being directly connected with one another; and
temperature sensing means, said temperature sensing means being disposed in said first portion at a location which is proximate the second portion, wherein a cooling element is disposed in said first portion in the vicinity of said temperature sensor for inducing localized cooling of the gases.

8. A resonance detecting device comprising:
a passage through which gases flow, said passage having a first portion having a first cross-sectional area, which opens into a second portion having a different cross-sectional area; and
temperature sensing means, said temperature sensing means being disposed in a location of said first portion which is proximate the second portion,
wherein a cooling means is disposed in said first portion in the vicinity of said temperature sensor, and
wherein said cooling means comprises a heat pipe.

9. A resonance detecting device comprising:
a passage through which gases flow, said passage having a first portion having a first cross-sectional area, and a second portion having a second cross-sectional area which is larger that the first cross-sectional area, said first portion being connected directly to said second portion at a location of said second portion whereat a pressure wave anti-node tends to occur, said first portion forming the only inlet for the second portion, and said second portion defining means which cools a flow of heated gas which flows thereinto from said first portion; and
temperature sensing means, said temperature sensing means being disposed in said first portion at a location which is proximate the second portion wherein a heating element is disposed within said first portion in the vicinity of said temperature sensing means.

10. A resonance detecting device comprising:
a passage, said passage having an opening; and
temperature sensing means, said temperature sensing means being disposed within said passage in the vicinity of said opening for detecting the temperature of a fluid in said passage,
wherein said temperature sensing means is operatively coupled to a processing means, said processing means processing a signal output of said temperature sensor for producing a differential value representative of fluctuations in said temperature signal, and
wherein said processing means is operably connected to an actuator for a tuning means, said tuning means being operable for altering a resonance frequency of a passage.

11. A resonance detecting device as set forth in claim 10 wherein said tuning means is defined by a variable flow restricting arrangement, said variable flow restricting arrangement being operable for selectively restricting a flow of gasses within said passage.

12. A resonance detecting device comprising:
a passage through which heated gases flow;
a temperature sensor; and
means which defines part of said passage for exposing said temperature sensor to a flow of gas the temperature of which is different from the bulk of the gas which flows through said passage, when resonance occurs in said passage.

13. A resonance detecting device comprising:
a passage through which gases flow;
a conduit having an upstream end and a downstream end, said conduit being disposed with said passage so that both the upstream end and the downstream end open into said passage;
temperature sensing means, said temperature sensing means being disposed in said conduit and arranged to producing a signal indicative of the sensed temperature; and
a heat exchange element which is arranged to project into said conduit adjacent said temperature sensing means and which is arranged to remove heat from the gases flowing in said conduit.

14. A resonance detecting device comprising:
a plurality of temperature sensors arranged at spaced intervals along a passage through which gases flow, said plurality of temperature sensors being disposed at a location where resonance tends to induce the gases in said passage to flow back and forth; and
heat transfer means disposed in the passage at a location proximate said plurality of temperature sensors for inducing a change in the temperature of the gases which tend to be carried back and forth over said plurality of sensors when resonance occurs.

* * * * *